(12) United States Patent
Shimizu et al.

(10) Patent No.: US 11,014,433 B2
(45) Date of Patent: May 25, 2021

(54) SUN VISOR CONNECTOR

(71) Applicant: Yazaki Corporation, Tokyo (JP)

(72) Inventors: Tomohiko Shimizu, Shizuoka (JP);
Kaname Hatano, Shizuoka (JP)

(73) Assignee: YAZAKI CORPORATION, Tokyo (JP)

(*) Notice: Subject to any disclaimer, the term of this patent is extended or adjusted under 35 U.S.C. 154(b) by 141 days.

(21) Appl. No.: 16/527,297

(22) Filed: Jul. 31, 2019

(65) Prior Publication Data

US 2020/0039329 A1 Feb. 6, 2020

(30) Foreign Application Priority Data

Aug. 2, 2018 (JP) .............................. JP2018-145716

(51) Int. Cl.
*B60J 3/02* (2006.01)
*F16B 9/00* (2006.01)
*B60Q 3/252* (2017.01)

(52) U.S. Cl.
CPC ............ *B60J 3/0217* (2013.01); *B60Q 3/252* (2017.02); *F16B 9/056* (2018.08)

(58) Field of Classification Search
CPC ...... B60J 3/0217; B60J 3/0221; B60J 3/0252; F16B 9/02; B60Q 3/252
USPC .......................................... 296/97.12, 97.13
See application file for complete search history.

(56) References Cited

U.S. PATENT DOCUMENTS

| 5,158,334 | A | * | 10/1992 | Felland | ................. | B60J 3/0234 |
| | | | | | | 296/97.12 |
| 6,319,014 | B1 | * | 11/2001 | Gunay | .................. | B60J 3/0217 |
| | | | | | | 362/144 |
| 7,234,751 | B2 | * | 6/2007 | Umemura | .............. | B60J 3/0252 |
| | | | | | | 296/97.12 |
| 8,424,950 | B2 | | 4/2013 | Ebisuoka | | |
| 9,738,139 | B2 | * | 8/2017 | Jin | ......................... | B60J 3/0221 |
| 2005/0104409 | A1 | | 5/2005 | Garcia | | |

FOREIGN PATENT DOCUMENTS

| JP | 7-142111 A | 6/1995 |
| JP | 2011-230559 A | 11/2011 |
| JP | 2015-220172 A | 12/2015 |

* cited by examiner

*Primary Examiner* — Joseph D. Pape
(74) *Attorney, Agent, or Firm* — Sughrue Mion, PLLC

(57) ABSTRACT

A sun visor connector includes: a bracket; an arm portion having an end inserted through the bracket to be rotatably arranged; a housing fixed to the bracket and arranged in a vicinity of the end of the arm portion inserted through the bracket; a pair of connector terminals accommodated in the housing and connected to counterpart terminals; a pair of arm connection parts provided in an elastically deformable manner on the pair of connector terminals and connected by sandwiching the end of the arm portion by a biasing force; and a preliminary displacement portion provided in the housing, abutting on the pair of arm connection parts, and causing the pair of arm connection parts to be arranged in a separated manner by keeping a biasing force against the end of the arm portion.

4 Claims, 24 Drawing Sheets

SUN VISOR CONNECTOR

CROSS-REFERENCE TO RELATED APPLICATION

The present application is based on, and claims priority from Japanese Patent Application No. 2018-145716, filed on Aug. 2, 2018, the entire contents of which are incorporated herein by reference.

TECHNICAL FIELD

The disclosure relates to a sun visor connector, and more particularly, to a sun visor connector applied to a sun visor rotatably attached to an attachment member.

BACKGROUND

As a sun visor connector according to a conventional example, there has been known one that includes: a bracket attached to a ceiling of a vehicle interior as an attachment member; a support shaft as an arm portion arranged on a vehicle interior side of the bracket, configured to rotatably support a sun visor main body, and having an end inserted through the bracket so as to be rotatably arranged; a housing fixed to a vehicle interior outer side of the bracket and arranged in the vicinity of the end of the support shaft inserted through the bracket; a pair of connector terminals accommodated in the housing and connected to counterpart terminals arranged on the vehicle interior outer side; and a pair of arm connection parts provided on the pair of connector terminals in an elastically deformable manner and connected by sandwiching the end of the support shaft by a biasing force (see JP 2011-230559 A).

In the known sun visor connector, the sun visor main body is rotated so that a contact state and a non-contact state between the pair of arm connection parts and the end of the support shaft are switched, and switching on and off of a lighting device provided in the sun visor main body is performed.

SUMMARY

In the known sun visor connector, the housing is assembled to the bracket in a state in which the pair of connector terminals is accommodated in the housing, and the end of the arm portion is arranged and connected between the pair of arm connection parts.

At this time, if a distance between the pair of arm connection parts is narrower than a width of the end of the arm portion, what is called a strike, where the pair of arm connection parts collides with the end of the arm portion, occurs. This may have caused deformation of the pair of arm connection parts, and lowered connection reliability.

In view of the above, an object of the present application is to provide a sun visor connector by which connection reliability can be maintained.

A sun visor connector according to an aspect of the present application includes: a bracket attached to an attachment member; an arm portion arranged on a side of one surface of the attachment member of the bracket, rotatably supporting a sun visor main body, and having an end inserted through the bracket so as to be rotatably arranged; a housing fixed to a side of other surface of the attachment member of the bracket and arranged in a vicinity of the end of the arm portion inserted through the bracket; a pair of connector terminals accommodated in the housing and connected to counterpart terminals arranged on the other surface of the attachment member; a pair of arm connection parts provided on the pair of connector terminals in an elastically deformable manner and connected by sandwiching the end of the arm portion by a biasing force; and a preliminary displacement portion provided in the housing, abutting on the pair of arm connection parts, and causing the pair of arm connection parts to be arranged in a separated manner by keeping a biasing force against the end of the arm portion.

In such a sun visor connector, the housing is provided with the preliminary displacement portion abutting on the pair of arm connection parts and causing the pair of arm connection parts to be arranged in a separated manner by keeping the biasing force against the end of the arm portion. Accordingly, space between the pair of arm connection parts can be widened in a state where the pair of connector terminals is accommodated in the housing.

By assembling the housing to the bracket in a state in which space between the pair of arm connection parts is widened by the preliminary displacement portion, the pair of arm connection parts can be prevented from hitting the end of the arm portion hard, and deformation of the pair of arm connection parts can be suppressed.

Further, since the biasing force is kept in the pair of arm connection parts in a state of being in contact with the preliminary displacement portion, a contact load between the pair of arm connection parts and the end of the arm portion can be maintained, and the pair of connector terminals and the arm portion can be stably connected.

Therefore, in such a sun visor connector, when the housing is assembled to the bracket, the arm connecting portion is prevented from hitting the end of the arm portion and the contact load between the pair of arm connection parts and the end of the arm portion can be maintained. Accordingly, connection reliability can be maintained.

The preliminary displacement portion may include a pair of ribs provided to extend in the accommodating direction when the connector terminal is accommodated in the housing. Then a taper may be provided on a front side in the accommodating direction of each of the pair of ribs and inclined in a direction of separating the pair of arm connection parts.

In such a sun visor connector, since the taper is provided on a front side of the accommodating direction of each of the pair of ribs and inclined in the direction for separating the pair of arm connection parts, space between the pair of arm connection parts can be widened in conjunction with operation of accommodating the connector terminal in the housing.

The housing may be provided with a pair of excessive displacement preventing portions which abuts against the pair of arm connection parts before the pair of arm connection parts is excessively displaced in the direction of separation.

In such a sun visor connector, since the housing is provided with the pair of excessive displacement preventing portions that abuts against the pair of arm connection parts before the pair of arm connection parts is excessively displaced in the separating direction, the pair of arm connection parts can be prevented from being displaced excessively and deformed when the connector terminal is accommodated in the housing or when the end of the arm portion is inserted between the pair of arm connection parts.

The housing may be provided with a pair of deformation preventing portions that abuts on the pair of arm connection parts in a detaching direction when the housing is detached from the bracket.

In such a sun visor connector, the housing is provided with the deformation preventing portions that abut on the pair of arm connection parts in the detaching direction when the housing is detached from the bracket. Accordingly, when the housing is detached from the bracket, the arm connection parts can be prevented from being deformed in the opposite direction to the detaching direction by sliding between the pair of arm connection parts and the end of the arm portion.

According to the aspect of the present application, an advantageous effect in which a sun visor connector capable of maintaining connection reliability can be provided is achieved.

DETAILED DESCRIPTION

Figure 1:
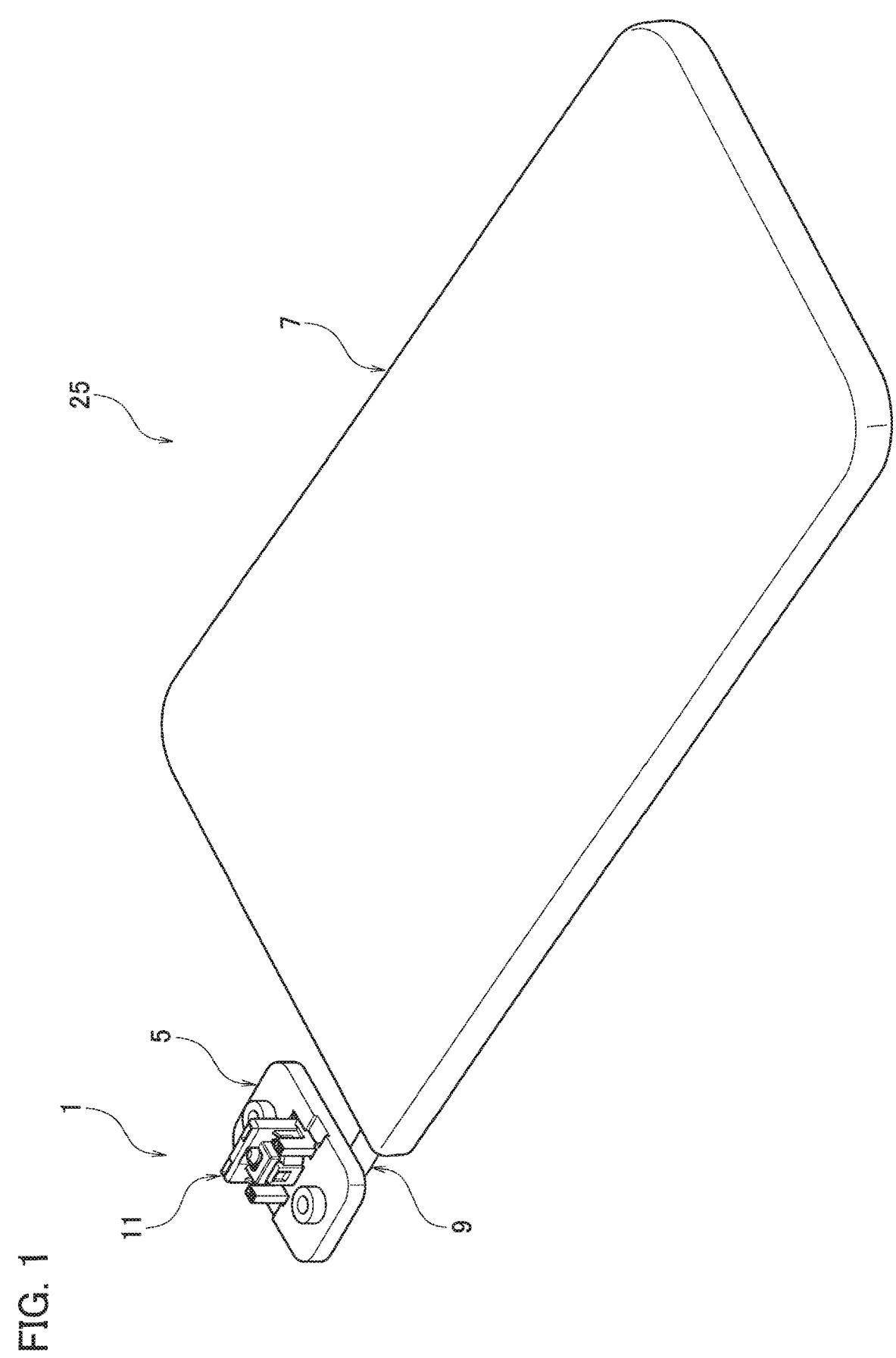
FIG. 1 is a perspective view of a sun visor to which a sun visor connector according to each embodiment is applied.
Figure 2:
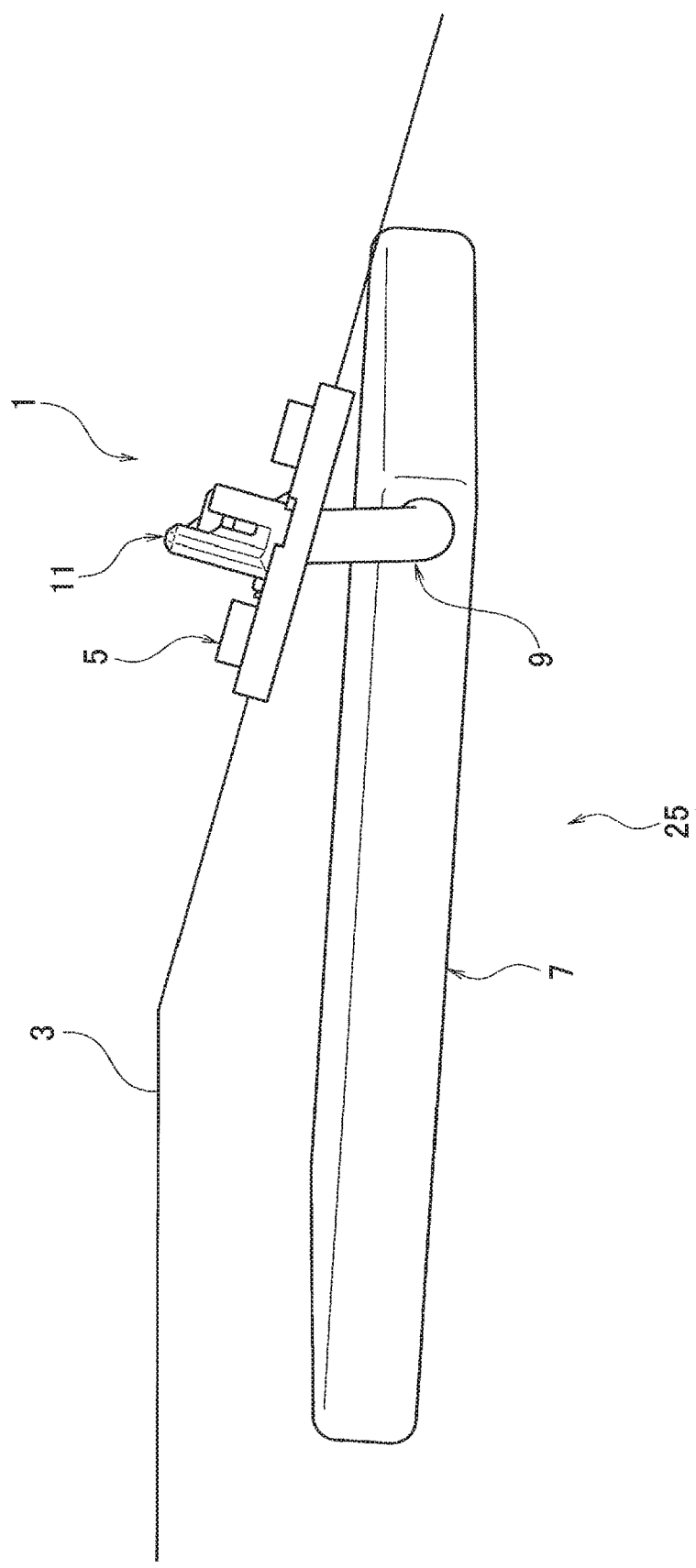
FIG. 2 is a side view when the sun visor to which the sun visor connector according to each embodiment is applied is attached to an attachment member.
Figure 3:
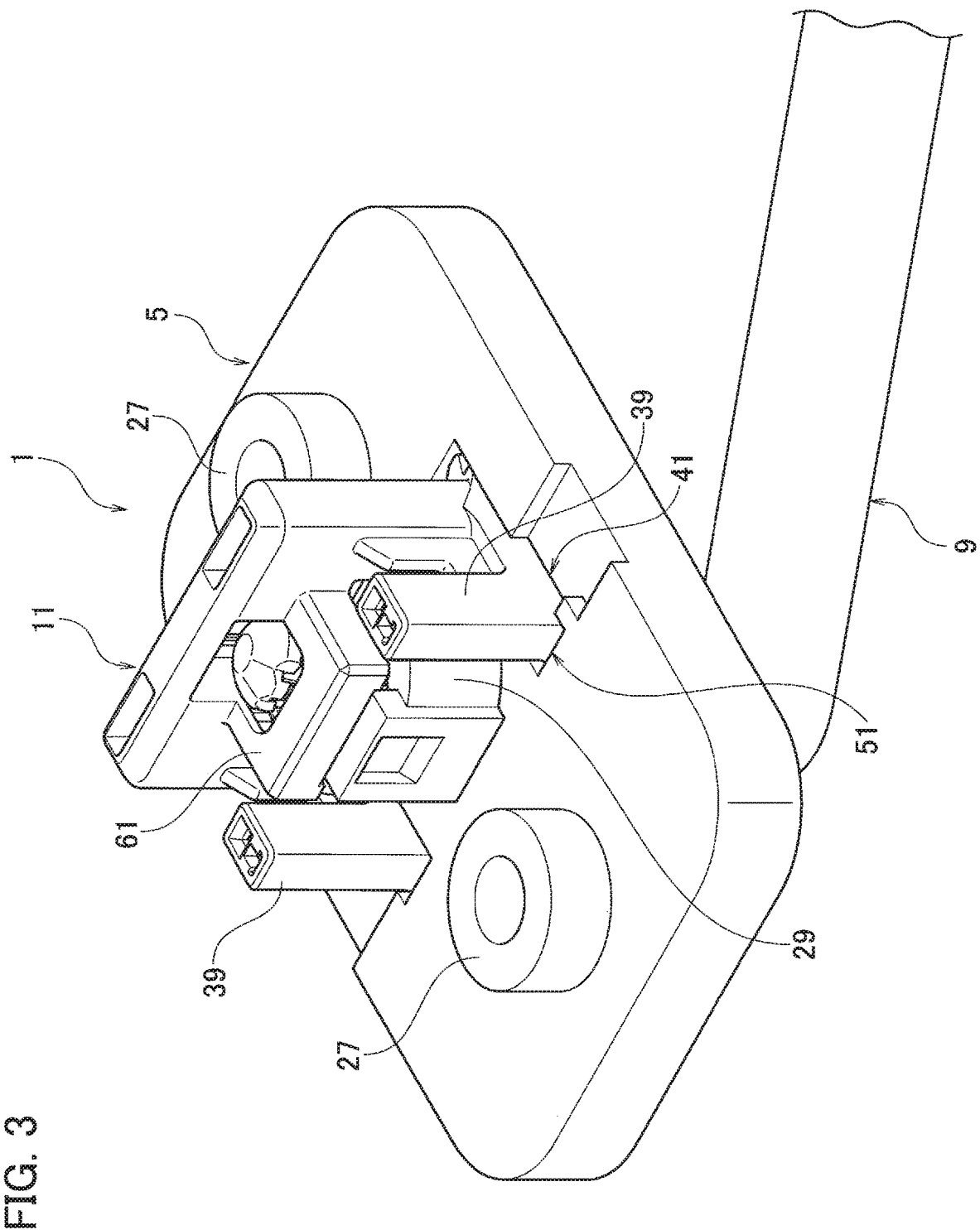
FIG. 3 is a perspective view of a sun visor connector according to a first embodiment.
Figure 4:
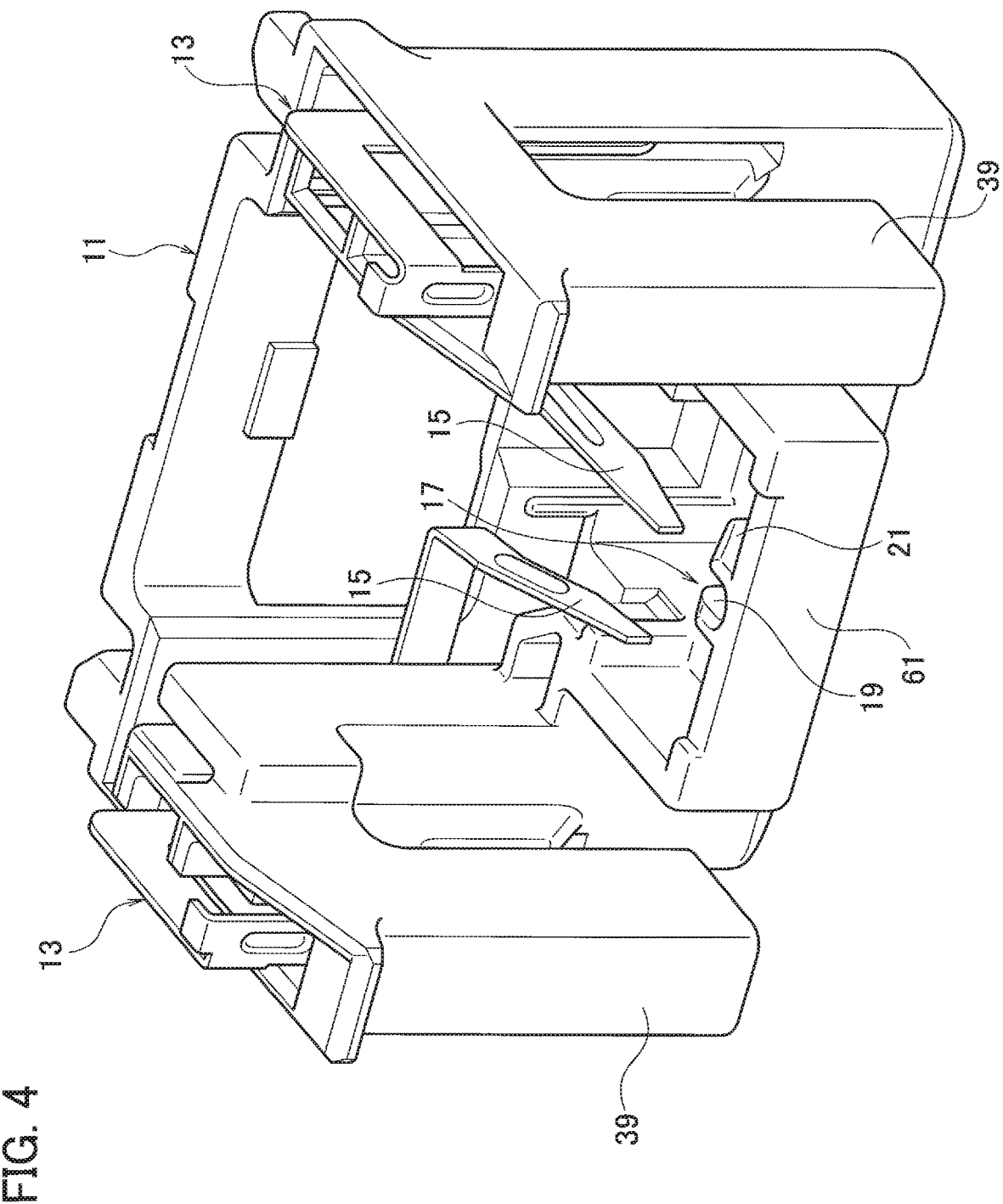
FIG. 4 is a perspective view when a pair of connector terminals is accommodated in a housing of the sun visor connector according to the first embodiment.
Figure 5:
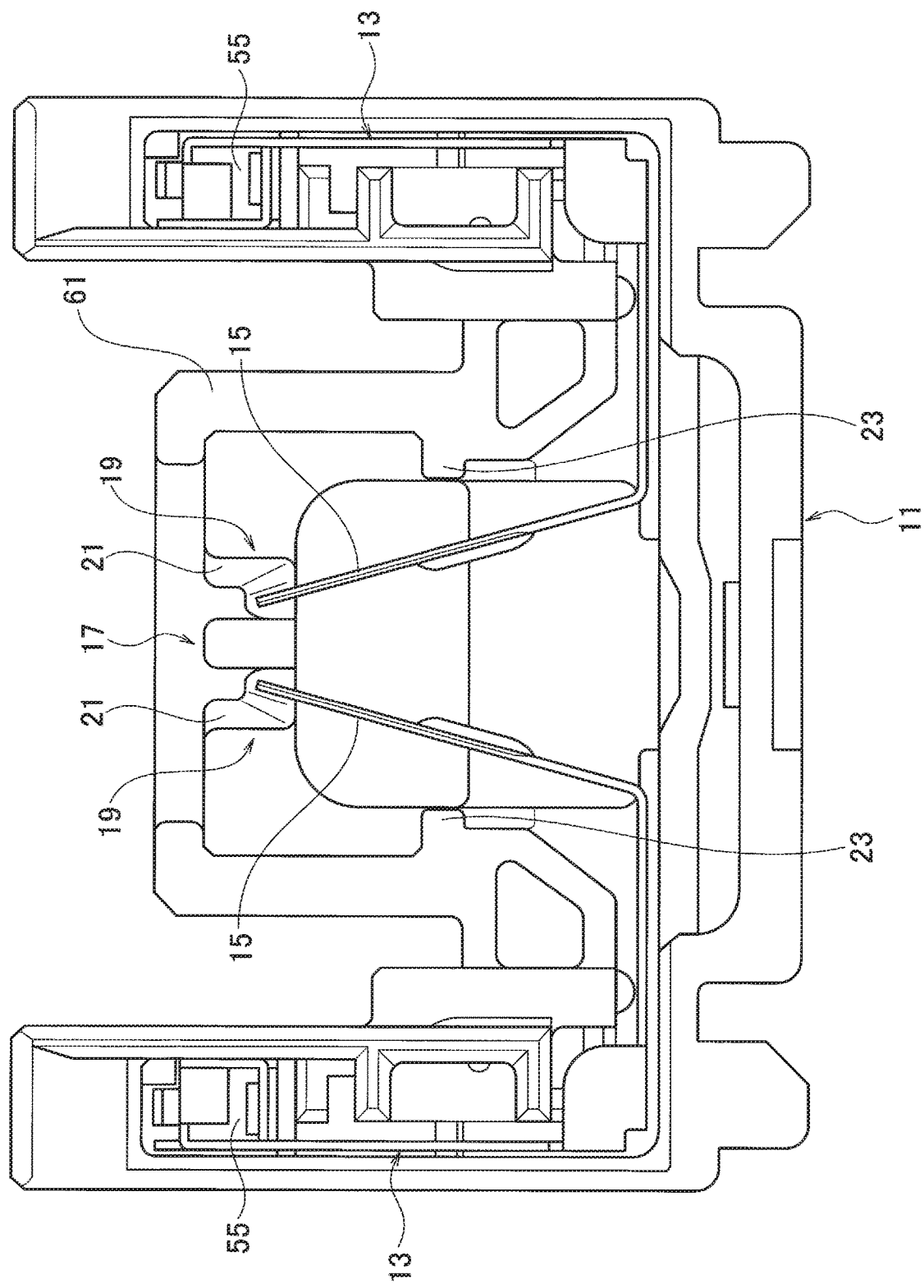
FIG. 5 is a plan view of FIG. 4.
Figure 6:
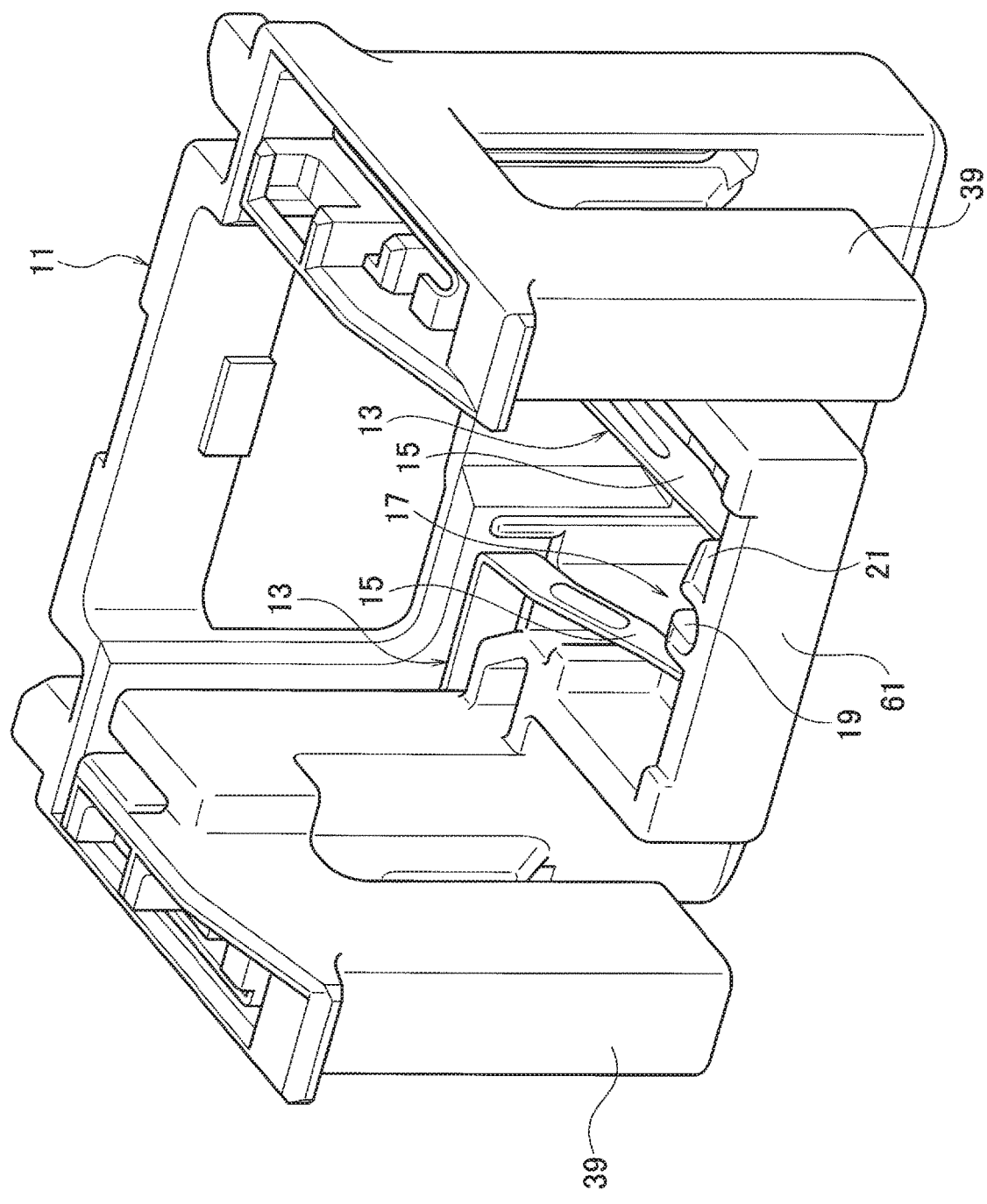
FIG. 6 is a perspective view when the pair of connector terminals is accommodated in the housing of the sun visor connector according to the first embodiment.
Figure 7:
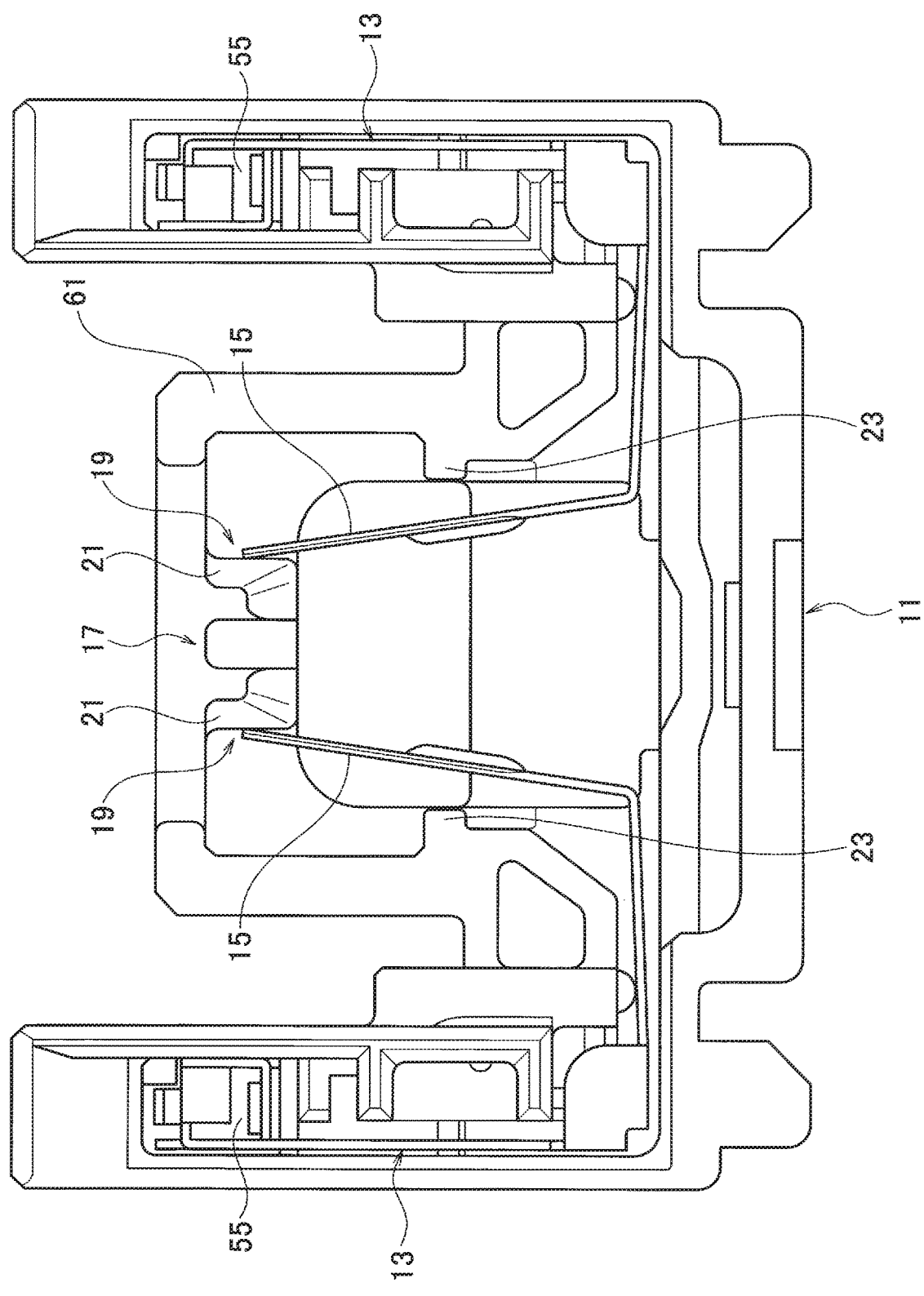
FIG. 7 is a plan view of FIG. 6.
Figure 8:
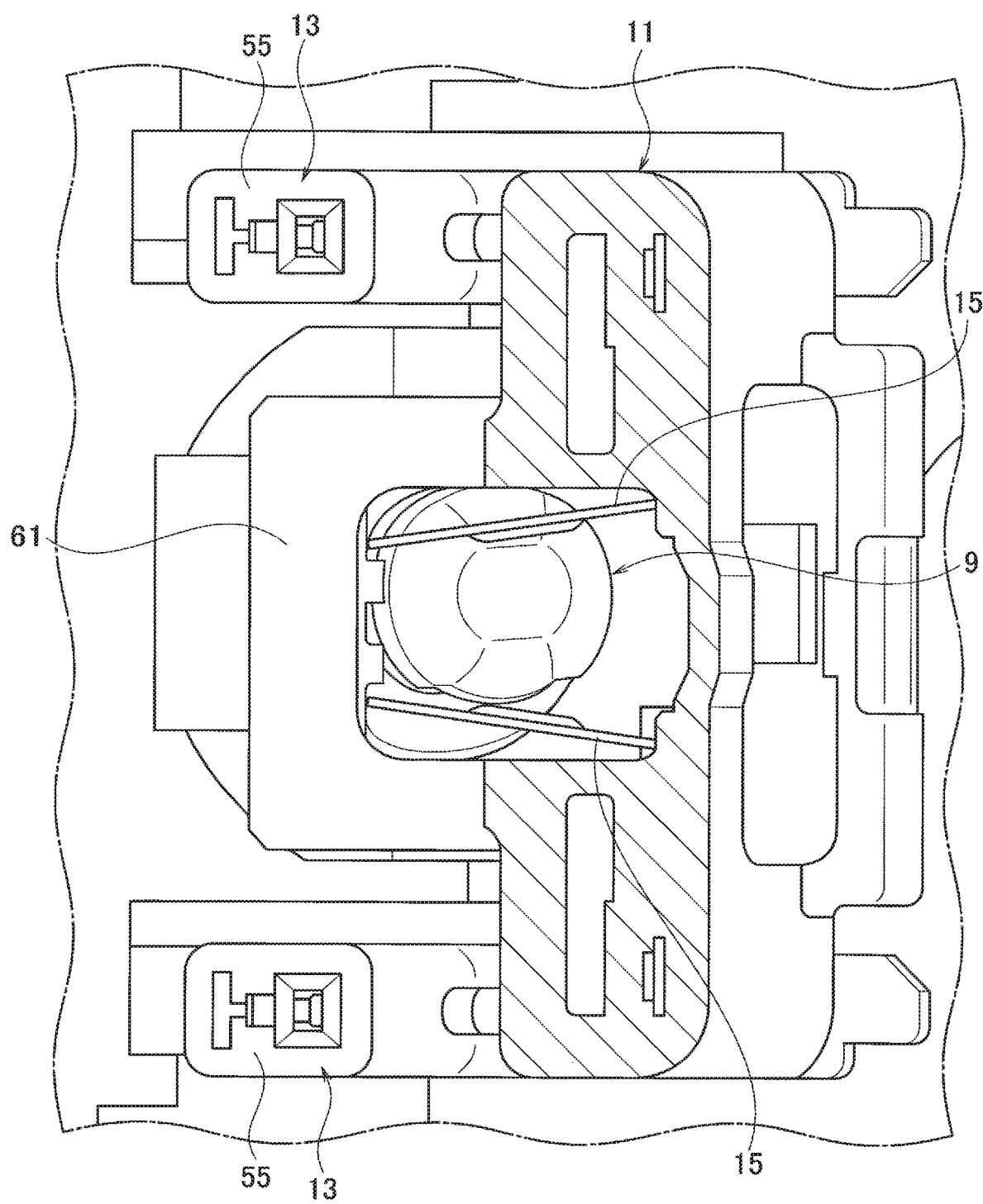
FIG. 8 is a cross-sectional view when the housing is assembled to a bracket of the sun visor connector according to the first embodiment.
Figure 9:
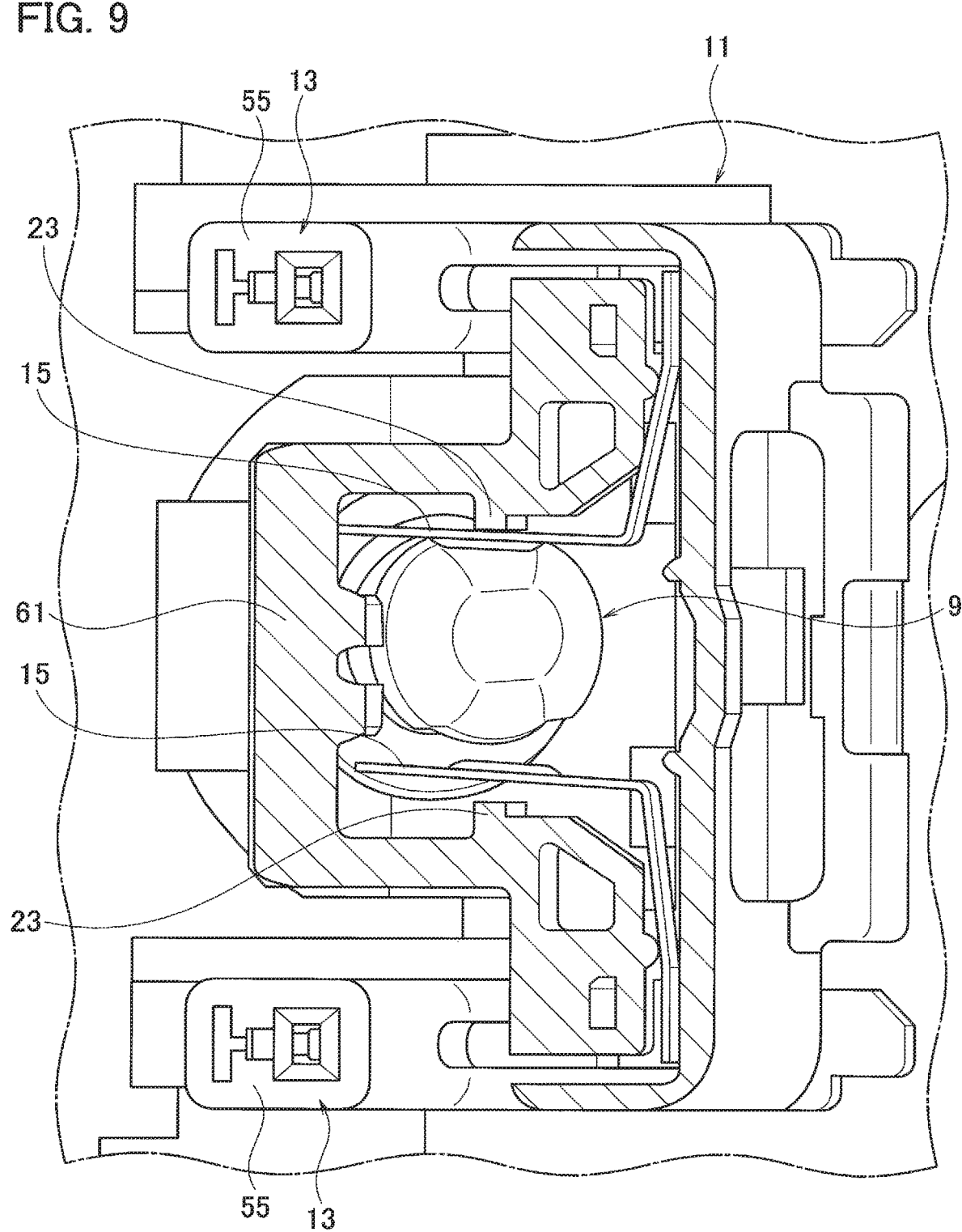
FIG. 9 is a cross-sectional view when an arm connection part of the sun visor connector according to the first embodiment abuts on an excessive displacement prevention portion.
Figure 10:
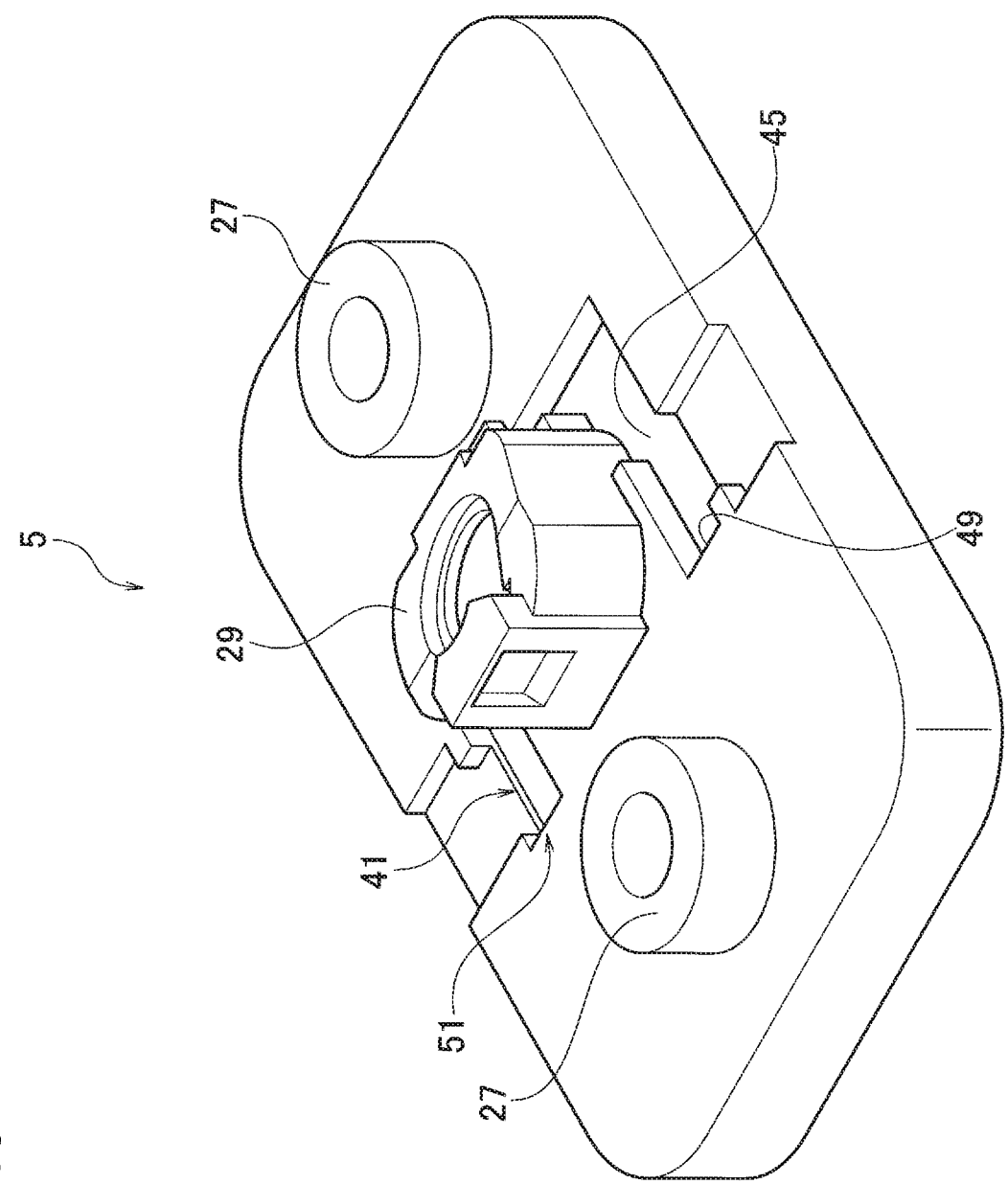
FIG. 10 is a perspective view of the bracket of the sun visor connector according to the first embodiment.

A sun visor connector according to embodiments will be described with reference to FIGS. 1 to 24.

First Embodiment

A first embodiment will be described with reference to FIGS. 1 to 13.

A sun visor connector 1 according to the first embodiment includes: a bracket 5 attached to an attachment member (a ceiling of a vehicle interior) 3; an arm portion 9 that is arranged on one surface side (hereinafter referred to as the "vehicle interior side") of the attachment member 3 of the bracket 5, rotatably supports a sun visor main body 7, and has an end inserted through the bracket 5 so as to be rotatably arranged; a housing 11 that is fixed to the other surface side (hereinafter referred to as the "vehicle interior outer side") of the attachment member 3 of the bracket 5 and arranged in the vicinity of the end of the arm portion 9 inserted through the bracket 5; a pair of connector terminals 13 that is accommodated in the housing 11 and connected to counterpart terminals (not illustrated) arranged on the vehicle interior outer side; and a pair of arm connection parts 15 that is provided on the pair of connector terminals 13 in an elastically deformable manner and connected by sandwiching the end of the arm portion 9 by a biasing force.

The housing 11 is provided with a preliminary displacement portion 17 which abuts against the pair of arm connection parts 15 and causes the pair of arm connection parts 15 to be arranged separately while keeping a biasing force against the end of the arm portion 9.

The preliminary displacement portion 17 includes a pair of ribs 19 extending in an accommodating direction when the pair of connector terminals 13 is accommodated in the housing 11. On a front side in the accommodating direction of each of the ribs 19, a taper 21 inclined in a direction in which the pair of arm connection parts 15 is separated is provided.

The housing 11 is provided with an excessive displacement preventing portion 23 which abuts against the pair of arm connection parts 15 before the pair of arm connection parts 15 is excessively displaced in the direction of separation.

As illustrated in FIGS. 1 to 13, the sun visor connector 1 is applied to a sun visor 25 attached to a ceiling of a vehicle interior as the attachment member 3.

The sun visor 25 includes the sun visor main body 7 and the sun visor connector 1.

The sun visor main body 7 is formed in a rectangular shape and arranged on the vehicle interior side of the ceiling as the attachment member 3, has a mirror (not illustrated) and a lamp (not illustrated) for illuminating the mirror arranged on a surface, and accommodates a lighting device (not illustrated) for switching on and off a lamp in the inside.

The sun visor main body 7 is arranged with the arm portion 9 that is inserted through a long side portion of the sun visor main body 7 and exposed from an end portion of the sun visor main body 7 toward the ceiling (attachment member 3). A power supply (not illustrated) for supplying power arranged on the vehicle interior outer side of the ceiling (attachment member 3) and the lighting device (not illustrated) accommodated in the sun visor main body 7 are electrically connected via the sun visor connector 1.

The sun visor connector 1 includes the bracket 5, the arm portion 9, the housing 11, and the pair of connector terminals 13.

The bracket 5 is formed in a rectangular plate shape, and is fixed to the attachment member 3 by a fixing member (not illustrated), such as a bolt, at attaching portions 27 provided on both sides in a longitudinal direction of the bracket 5.

In a center portion of the bracket 5, a cylindrically-formed support portion 29, through which the end of the arm portion 9 is inserted, is provided for rotatably supporting the arm portion 9.

Figure 11:
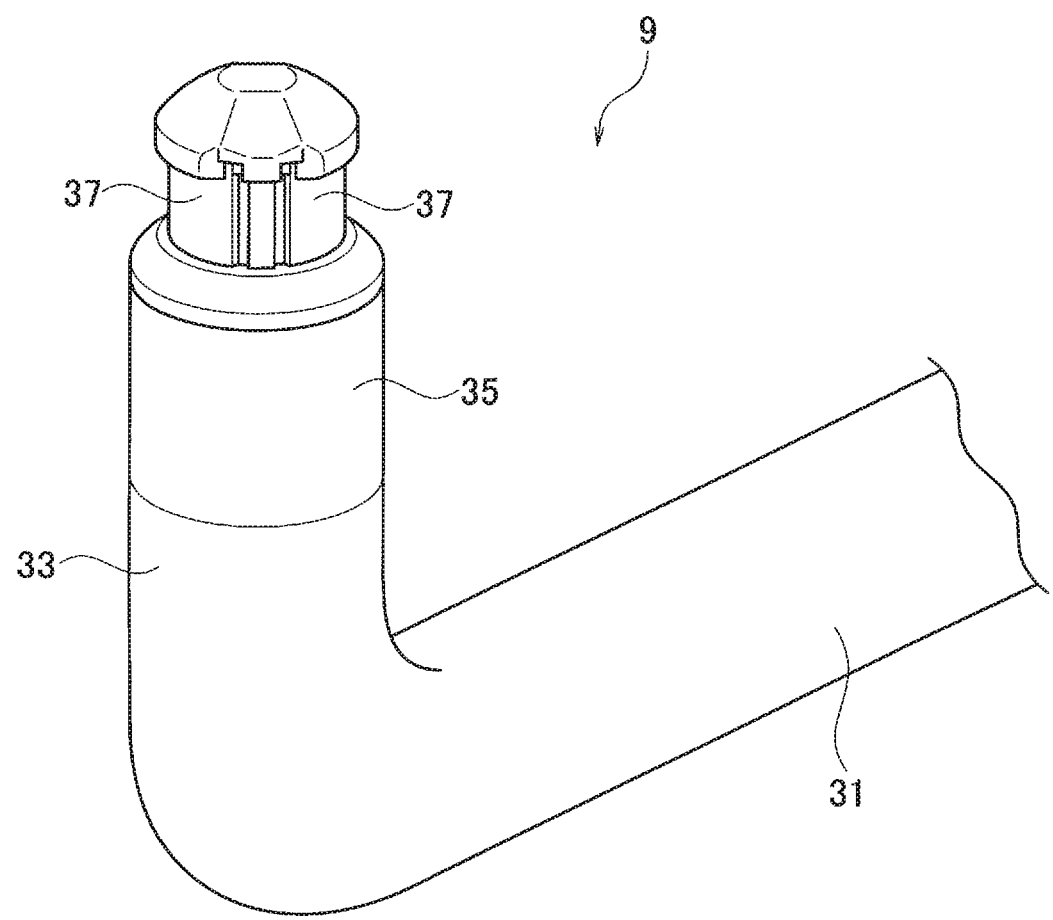
FIG. 11 is a perspective view of an arm portion of the sun visor connector according to the first embodiment.
Figure 12:
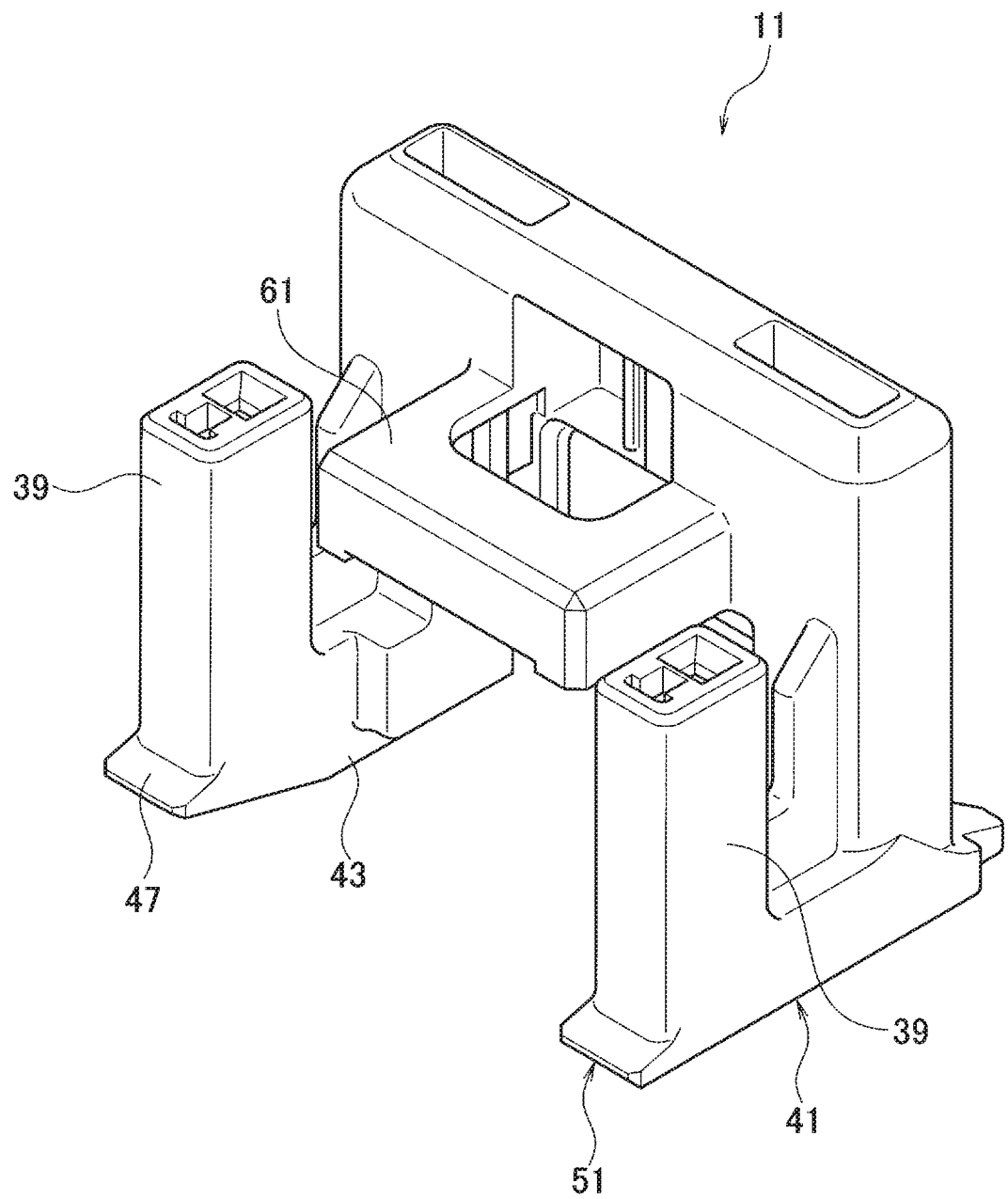
FIG. 12 is a perspective view of the housing of the sun visor connector according to the first embodiment.
Figure 13:
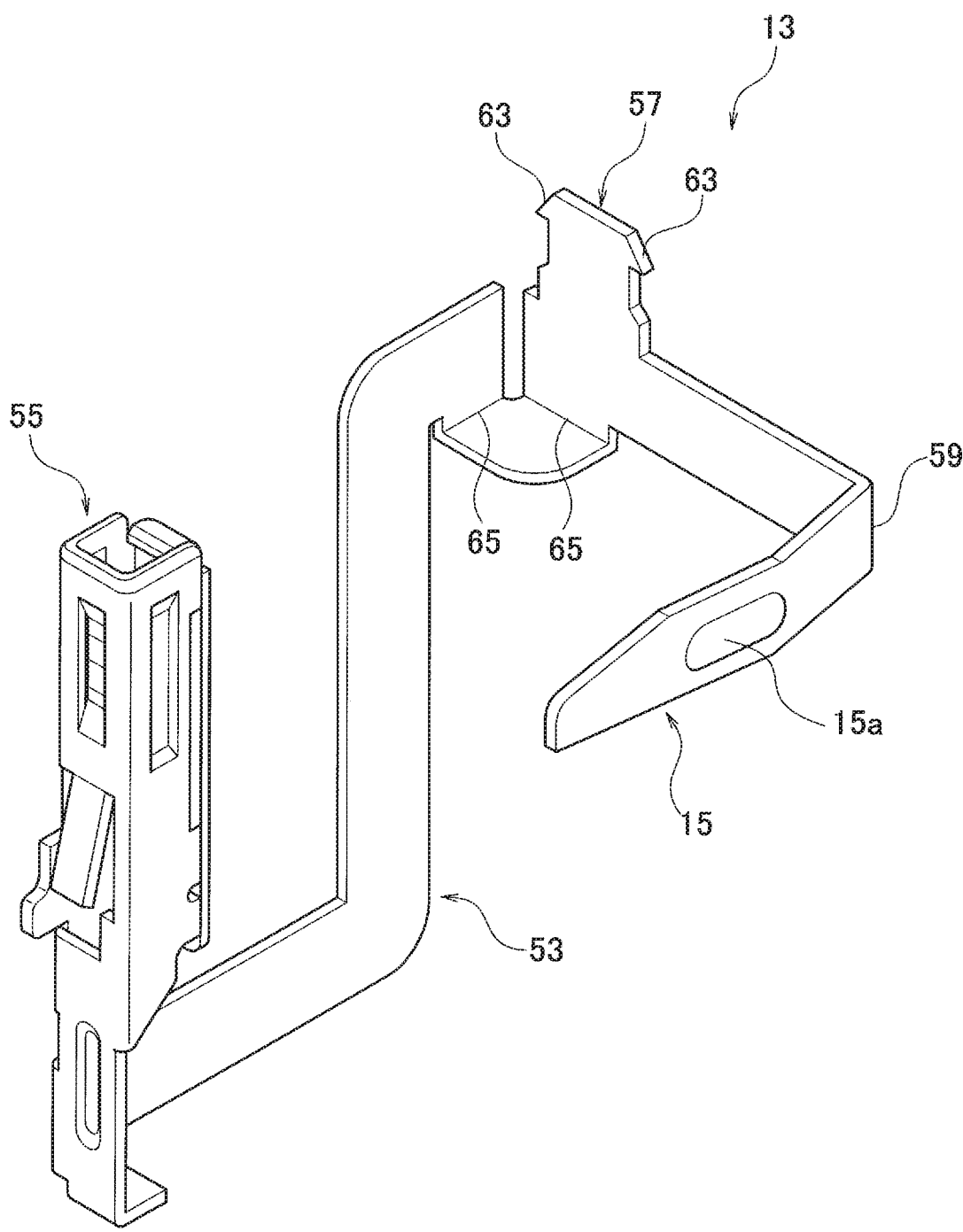
FIG. 13 is a perspective view of one of the pair of connector terminals of the sun visor connector according to the first embodiment.
Figure 14:
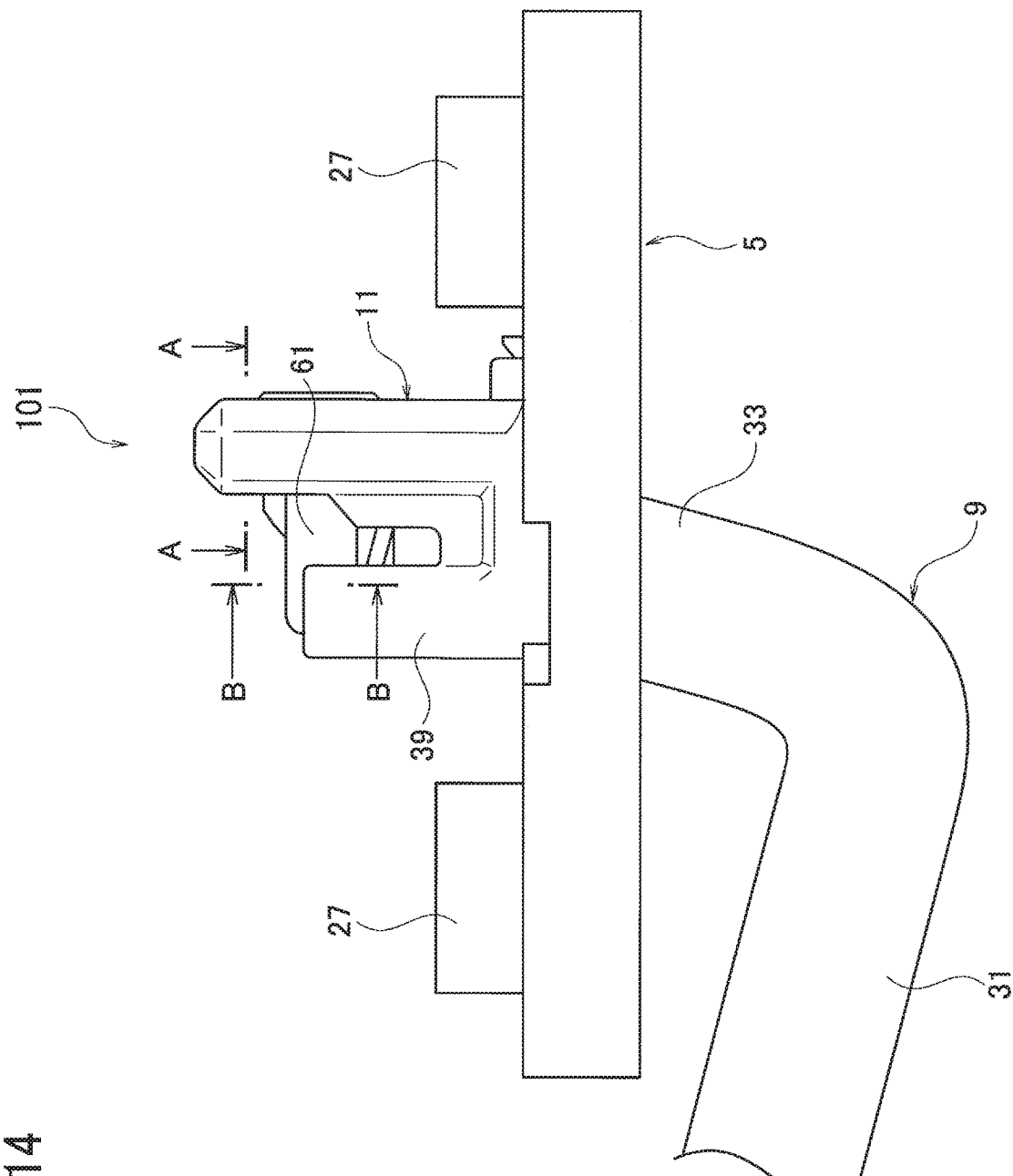
FIG. 14 is a side view of a sun visor connector according to a second embodiment.

In the inside of the arm portion 9, two conductors (not illustrated) electrically connected to the lighting device (not illustrated) accommodated in the sun visor main body 7 are insert-molded. The arm portion 9 includes a long shaft portion 31 and a short shaft portion 33 as illustrated in FIG. 11.

The long shaft portion 31 is inserted through the inside in the vicinity of the long side portion of the sun visor main body 7, and rotatably supports the sun visor main body 7 between a housing position (a position at which the sun visor main body 7 is rotated toward the attachment member 3) and a light shielding position (a position at which the sun visor main body 7 is rotated toward a windshield or side glass) around the axis of the long shaft portion 31.

At an end of the long shaft portion 31 located inside the sun visor main body 7, a pair of contact portions (not illustrated) on which two conductors insert-molded in the arm portion 9 are exposed is provided. The pair of contact portions (not illustrated) is provided so as to be in contact with a pair of terminals (not illustrated) provided on the lighting device (not illustrated).

For example, the pair of contact portions (not illustrated) and the pair of terminals (not illustrated) are not in contact at the housing position of the sun visor main body 7 so that the lamp is switched off, and are in contact at the light shielding position of the sun visor main body 7 so that the lamp is switched on.

At the end of the long shaft portion 31 exposed to the outside of the sun visor main body 7, the short shaft portion 33 is provided as a single continuous member.

The short shaft portion 33 is extended toward the attachment member 3 from the end of the long shaft portion 31 exposed from the sun visor main body 7 in such a manner that the arm portion 9 is formed in an L shape.

On the attachment member 3 side of the short shaft portion 33, a rotary portion 35 that is rotatable about an axis of the short shaft portion 33 is provided. The arm portion 9 is supported by the bracket 5 so as to be rotatable about the axis of the short shaft portion 33 as the rotary portion 35 is inserted through the support portion 29 of the bracket 5, and press-fitted and fixed.

With the short shaft portion 33 supported by the bracket 5 in this manner, the sun visor main body 7 is rotatable between a front position (a position at which the sun visor main body 7 moves to the windshield) and a side position (a position at which the sun visor main body 7 moves to the side glass) around the axis of the short shaft portion 33.

As illustrated in FIG. 11, at the end of the short shaft portion 33 that is inserted through the bracket 5, a pair of contact portions 37 in which two conductors (not illustrated) insert-molded in the inside of the arm portion 9 are exposed is provided.

The housing 11 is arranged so as to cover the pair of contact portions 37 on the bracket 5 in which the pair of contact portions 37 is arranged.

The housing 11 is made from an insulating material, such as synthetic resin. The housing 11 is provided with a pair of fitting portions 39 which is arranged on the vehicle interior outer side of the attachment member 3. To the pair of fitting portions 39, a counterpart housing (not illustrated) connected to the power supply for supplying power is fitted.

The housing 11 is arranged to cover the support portion 29 of the bracket 5. The housing 11 is fixed to the bracket 5 with an engaging portion 41 interposed between the housing 11 and the bracket 5.

The engaging portion 41 includes a pair of projecting portions 43 extending toward the bracket 5 from a surface facing the bracket 5 on which the pair of fitting portions 39 of the housing 11 is positioned, and a pair of recessed portions 45 provided on both sides of the support portion 29 of the bracket 5 in such a manner that the pair of projecting portions 43 can be inserted.

On one end side of the pair of engaging portions 41, there is provided a fulcrum portion 51 including a pair of fulcrum projecting portions 47 protruding outward from a side surface of the housing 11 on one end side of the pair of projecting portions 43 and a pair of fulcrum recessed portions 49 provided so as to be able to accommodate the pair of fulcrum projecting portions 47 by leaving an upper surface of the bracket 5 on one end side of the pair of recessed portions 45.

When the housing 11 is assembled to the bracket 5, the pair of fulcrum projecting portions 47 and the pair of fulcrum recessed portions 49 are engaged, and the fulcrum portion 51 becomes fulcrums for rotating the housing 11 with respect to the bracket 5.

By rotating the housing 11 with respect to the bracket 5 by using the fulcrum portion 51, the pair of projecting portions 43 is inserted into and engaged with the pair of recessed portions 45 at the engaging portion 41, and the housing 11 is fixed to the bracket 5.

The pair of connector terminals 13 is accommodated in the inside of the housing 11, and the counterpart housing is fitted to the pair of fitting portions 39. In this manner, supplying power to the lighting device accommodated in the inside of the sun visor main body 7 can be performed via the arm portion 9.

Each of the connector terminals 13 includes a main body portion 53, a counterpart connection portion 55, the arm connection part 15, and a fixing portion 57.

Since the pair of connector terminals 13 is formed symmetrically each other, one of the connector terminals 13 will be described below, and description of the other one of the connector terminals 13 will be omitted.

The main body portion 53 is made from a conductive material, formed in a flat plate shape, and bent. In this manner, the counterpart connection portion 55 is provided on one end side of the main body portion 53, and the arm connection part 15 is provided on the other end side of the main body portion 53.

The counterpart connection portion 55 is formed in a box shape in which an elastically deformable elastic piece having a contact point in the inside is arranged by being bent to one end side of the main body portion 53.

The counterpart connection portion 55 is arranged in the fitting portion 39 in a state of being accommodated in the housing 11. When a counterpart housing is fitted to the fitting portion 39, the counterpart connection portion 55 becomes in contact with a counterpart terminal (not illustrated) accommodated in the counterpart housing, and the connector terminal 13 and the counterpart terminal are electrically connected.

The arm connection part 15 is provided so as to be elastically deformable at a bending portion 59 by being bent to the other end side of the main body portion 53. The arm connection part 15 is provided with a contact 15a that protrudes toward the contact portion 37 of the arm portion 9.

The arm connection part 15 of one of the connector terminals 13 is arranged to face the arm connection part 15 of the other one of the connector terminals 13 with the pair of contact portions 37 (an end of the arm portion 9) sandwiched between them in a protective portion 61 that is provided in the housing 11 and exposed to the pair of contact portions 37 of the arm portion 9 in a state of being accommodated in the housing 11.

The pair of arm connection parts 15 is in contact with and sandwiches the pair of contact portions 37 by a biasing force of the pair of arm connection parts 15, and the pair of connector terminals 13 and the pair of contact portions 37 are electrically connected.

The arm portion 9 is rotatable about the axis of the short shaft portion 33 with respect to the bracket 5, so that the sun visor main body 7 is rotatable between the front position and the side position.

For such a movement of the sun visor main body 7, the pair of arm connection parts 15 and the pair of contact portions 37 are, for example, in contact at the front position of the sun visor main body 7 to switch on the lamp, and not in contact at the side potion of the sun visor main body 7 to switch off the lamp.

The fixing portion 57 for fixing the connector terminal 13 to the housing 11 is provided in the main body portion 53 positioned between the arm connection part 15 and the counterpart connection portion 55.

The fixing portion 57 protrudes from a side surface positioned between the counterpart connection portion 55 of the main body portion 53 and the arm connection part 15 toward an inner wall surface of the housing 11.

The fixing portion 57 is provided with a pair of press-fit portions 63 protruding outward in an inclined shape on both sides in a width direction.

The pair of press-fit portions 63 fixes the connector terminal 13 to the housing 11 as the connector terminal 13 is accommodated from an opening on the bracket 5 side of the housing 11 and is press-fitted to a press-fitted portion (not illustrated) provided inside the housing 11.

The fixing portion 57 is press-fitted to the press-fitted portion of the housing 11 in a state before the housing 11 is assembled to the bracket 5, and fixes the connector terminal 13 to the housing 11 in advance.

The main body portion 53 positioned between the fixing portion 57 and the counterpart connection portion 55 is provided with a bent portion 65 that is bent in a plane direction orthogonal to a fitting direction between the counterpart terminal and the counterpart connection portion 55, and a plane direction parallel to the fitting direction between the counterpart terminal and the counterpart connection portion 55.

The bent portion 65 attenuates vibration generated on the counterpart connection portion 55 side, such as free movement generated between the counterpart connection portion 55 and the counterpart terminal, and suppresses occurrence of contact failure on the arm connection part 15 side.

In addition, by providing the bent portion 65, the counterpart connection portion 55 and the arm connection part 15 can be arranged close to each other, and the housing 11 that accommodates the connector terminal 13 can be reduced in size.

The housing 11 accommodating the pair of connector terminals 13 is assembled to the bracket 5 by the engaging portion 41 by being rotated with respect to the bracket 5 with the fulcrum portion 51 as fulcrums.

At this time, the end of the arm portion 9 is inserted between the pair of arm connection parts 15, and the pair of arm connection parts 15 can be brought into contact with the pair of contact portions 37 of the arm portion 9.

When the end of the arm portion 9 is inserted between the pair of arm connection parts 15, the pair of arm connection parts 15 hits the end of the arm portion 9 if space between the pair of arm connection parts 15 is narrow, and there has been possibility that the pair of arm connection parts 15 is deformed.

In view of the above, the housing 11 is provided with the preliminary displacement portion 17 which abuts against the pair of arm connection parts 15 and causes the pair of arm connection parts 15 to be arranged separately while keeping a biasing force against the pair of contact portions 37 of the arm portion 9.

The preliminary displacement portion 17 is provided at a position corresponding to a free end side of the pair of arm connection parts 15 in the protective portion 61 of the housing 11, and includes the pair of ribs 19 provided to extend along the accommodating direction when the pair of connector terminals 13 is accommodated in the housing 11.

The pair of ribs 19 abuts on the free end side of the pair of arm connection parts 15 between the pair of arm connection parts 15 in a state where the pair of connector terminals 13 is accommodated in the housing 11, and the pair of arm connection parts 15 is arranged in a manner separated from each other, so that space between the pair of arm connection parts 15 is widened.

The space between the pair of arm connection parts 15 widened by the pair of ribs 19 is slightly smaller than a diameter of the end of the arm portion 9, and a biasing force of the pair of arm connection parts 15 is left so that the pair of arm connection parts 15 and the pair of contact portions 37 can contact each other with an appropriate contact load when the pair of contact portions 37 of the arm portion 9 is positioned between the pair of arm connection parts 15.

When the housing 11 is assembled to the bracket 5 by widening the space between the pair of arm connection parts 15 in advance by the preliminary displacement portion 17, the pair of arm connection parts 15 is prevented from hitting the end of the arm portion 9.

For this reason, deformation of the pair of arm connection parts 15 caused by the pair of arm connection parts 15 hitting the end of the arm portion 9 is suppressed, and a contact load between the pair of arm connection parts 15 and the pair of contact portions 37 is maintained, so that connection reliability can be maintained.

In addition, since a biasing force against the pair of contact portions 37 is kept for the pair of arm connection parts 15 displaced by the preliminary displacement portion 17, the contact load on the pair of contact portions 37 is not reduced, and connection reliability can be maintained.

The taper 21 inclined in a direction of separating the pair of arm connection parts 15 is provided on a front side in the accommodating direction (the side that abuts on the arm connection part 15 first when the connector terminals 13 are accommodated in the housing 11) of each of the ribs 19.

By providing the taper 21 on each of the ribs 19, the taper 21 and a corresponding arm connection part 15 slide in conjunction with accommodation operation of the connector terminal 13 in the housing 11, and the space between the pair of arm connection parts 15 can be widened (preliminarily displaced).

Here, if the pair of arm connection parts 15 is excessively displaced in the direction in which the arm connection parts 15 are separated from each other, the biasing force changes due to permanent deformation of the pair of arm connection parts 15, and the contact load on the pair of contact portions 37 may be lowered.

In view of the above, the housing 11 is provided with the pair of excessive displacement preventing portions 23 which abuts against the pair of arm connection parts 15 before the pair of arm connection parts 15 is excessively displaced in the direction of separation.

The pair of excessive displacement preventing portions 23 forms ribs that are provided to project toward the pair of arm connection parts 15 at positions facing the end of the arm portion 9 with the pair of arm connection parts 15 sandwiched between them in the protective portion 61 of the housing 11, and are provided to extend along a height direction of the housing 11.

The pair of excessive displacement preventing portions 23 abuts on the pair of arm connection parts 15 before the pair of arm connection parts 15 is displaced excessively in the direction of being separated from each other, when the connector terminal 13 is accommodated in the housing 11 or when the end of the arm portion 9 is inserted between the pair of arm connection parts 15.

By providing the pair of excessive displacement preventing portions 23 in the housing 11, the pair of arm connection parts 15 is not excessively displaced in the direction of separation, and generation of permanent deformation in the pair of arm connection parts 15 can be prevented.

For this reason, the biasing force of the pair of arm connection parts 15 does not change and a contact load on the pair of contact portions 37 is maintained, and the connection reliability can be maintained.

In the sun visor connector 1 according to the first embodiment, the housing 11 is provided with the preliminary displacement portion 17 that abuts on the pair of arm connection parts 15 and causes the pair of arm connection parts 15 to be arranged in a separated manner by keeping the biasing force against the end of the arm portion 9. Accordingly, the space between the pair of arm connection parts 15 can be widened in a state where the pair of connector terminals 13 is accommodated in the housing 11.

By assembling the housing 11 to the bracket 5 in a state in which the space between the pair of arm connection parts 15 is widened by the preliminary displacement portion 17, the arm connection part 15 can be prevented from hitting the end of the arm portion 9, and deformation of the arm connection part 15 can be suppressed.

Since the biasing force is kept in the pair of arm connection parts 15 in a state of being in contact with the preliminary displacement portion 17, a contact load between the pair of arm connection parts 15 and the end of the arm portion 9 can be maintained, and the pair of connector terminals 13 and the arm portion 9 can be stably connected.

Therefore, in the sun visor connector 1 according to the first embodiment, when the housing 11 is assembled to the bracket 5, the arm connection part 15 is prevented from hitting the end of the arm portion 9 and the contact load between the pair of arm connection parts 15 and the end of the arm portion 9 can be maintained. Accordingly, connection reliability can be maintained.

Since the taper 21 inclined in the direction for separating the pair of arm connection parts 15 is provided on a front side of the accommodating direction of each of the ribs 19, space between the pair of arm connection parts 15 can be widened in conjunction with operation of accommodating the connector terminal 13 in the housing 11.

Since the housing 11 is provided with the pair of excessive displacement preventing portions 23 that abuts against the pair of arm connection parts 15 before the pair of arm connection parts 15 is excessively displaced in the separating direction, the pair of arm connection parts 15 can be prevented from being displaced excessively and deformed when the connector terminal 13 is accommodated in the housing 11 or when the end of the arm portion 9 is inserted between the pair of arm connection parts 15.

Second Embodiment

A second embodiment will be described with reference to FIGS. 14 to 18.

In a sun visor connector 101 according to the second embodiment, the housing 11 is provided with a pair of deformation preventing portions 103 that abuts on the pair of arm connection parts 15 in a detaching direction when the housing 11 is detached from the bracket 5.

The pair of deformation preventing portions 103 is arranged in a manner being able to abut on a free end side of the pair of arm connection parts 15 until the pair of arm connection parts 15 is displaced in the separating direction from a state in which the pair of arm connection parts 15 and the end of the arm portion 9 are connected.

Note that, in the second embodiment, configurations which are similar to those of the first embodiment are denoted by the same reference numerals, and description of the configurations and functions refers to the first embodiment and will be omitted. Functions and effects obtained from such similar configurations are similar.

The pair of arm connection parts 15 is in contact with the pair of contact portions 37 of the arm portion 9 so as to sandwich them by applying a biasing force.

Figure 18:
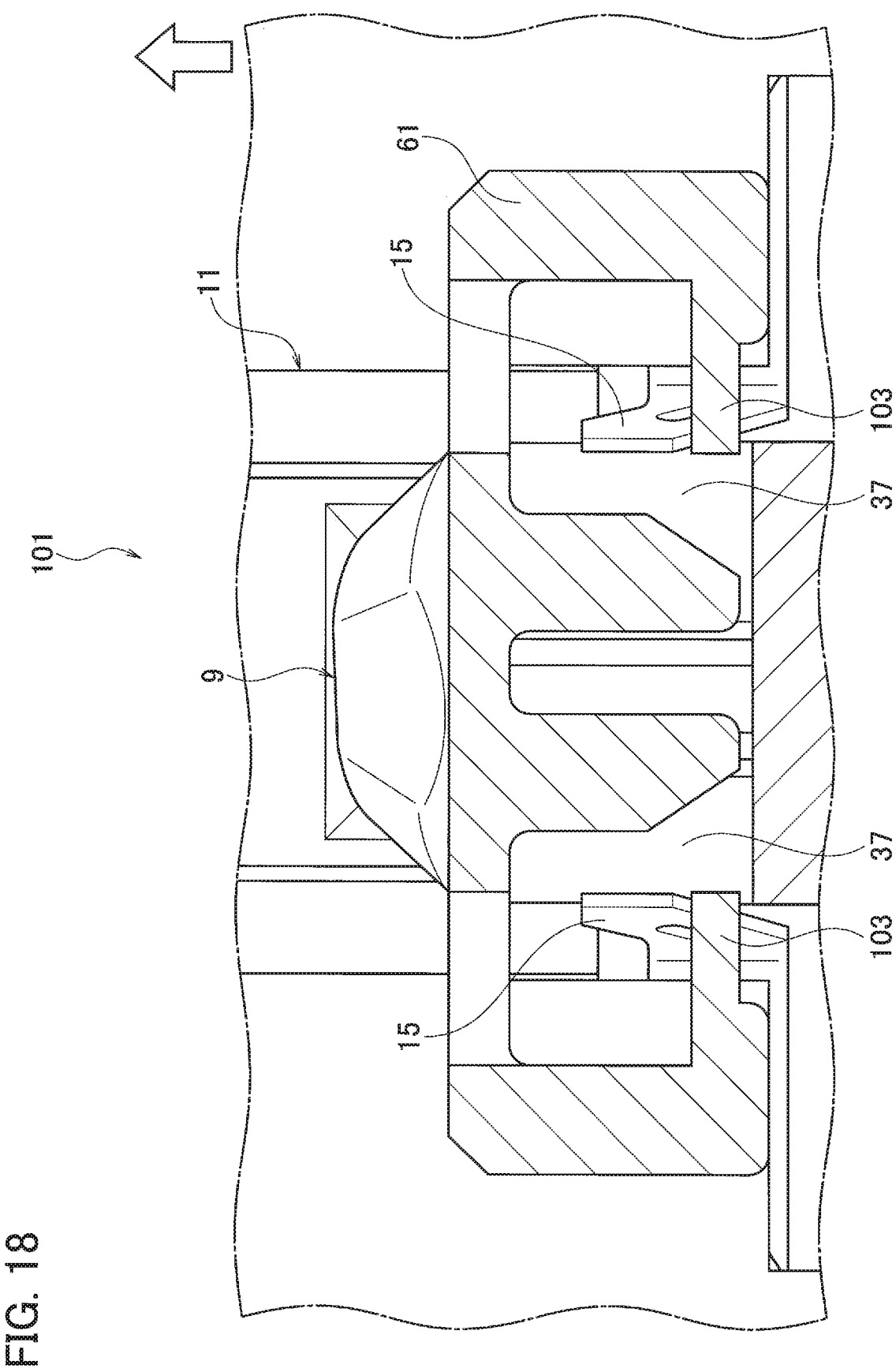
FIG. 18 is a cross-sectional view taken along line B-B in FIG. 14.
Figure 19:
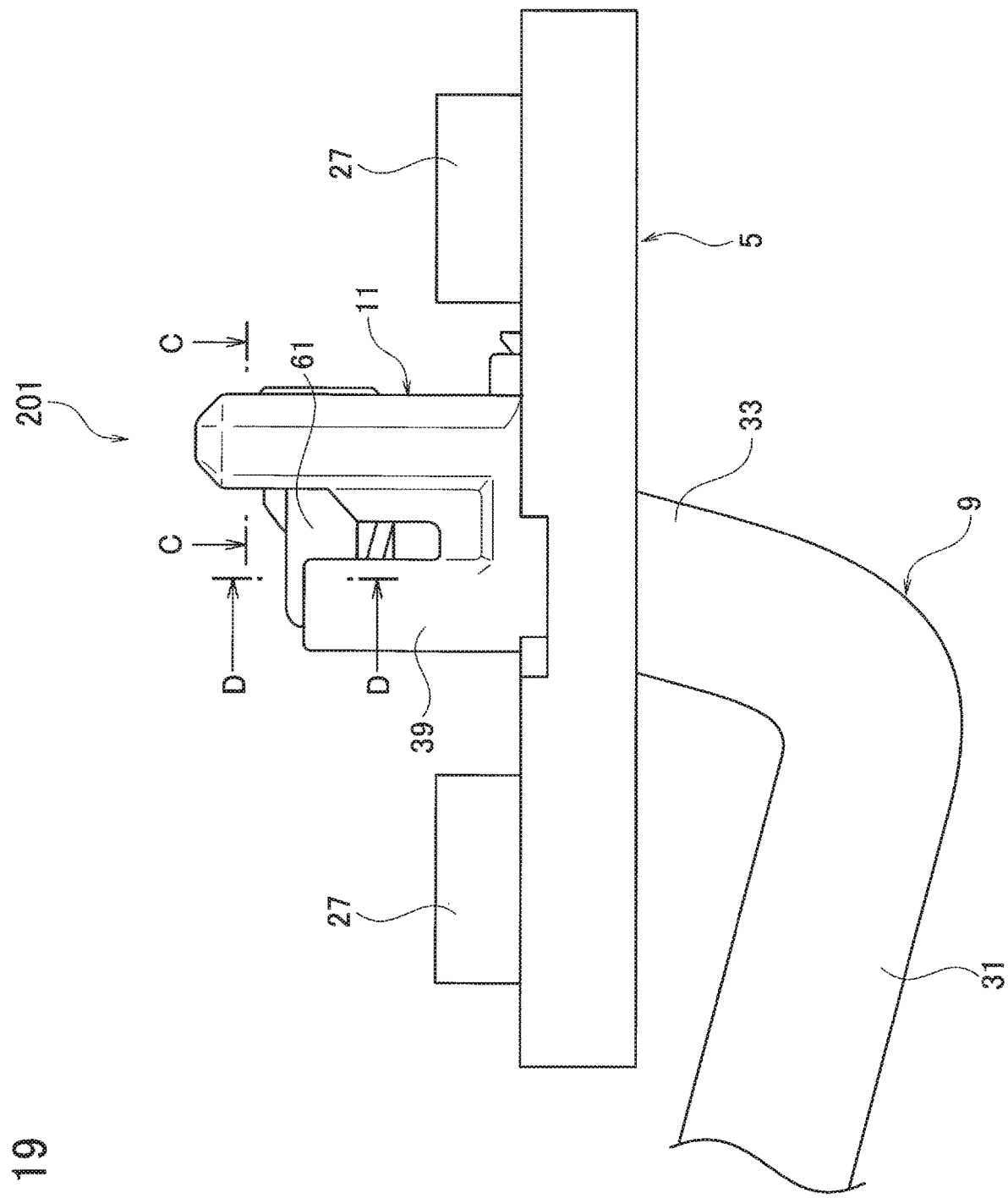
FIG. 19 is a side view of a sun visor connector according to a third embodiment.

For this reason, when the housing 11 is detached from the bracket 5, sliding friction is generated between the pair of arm connection parts 15 and the pair of contact portions 37 (the end of the arm portion 9) along with the movement of the housing 11 in a detaching direction (an arrow direction in FIG. 18).

Due to the sliding friction between the pair of arm connection parts 15 and the end of the arm portion 9, there has been possibility that the pair of arm connection parts 15 is deformed in an opposite direction to a detaching direction of the housing 11 from the bracket 5 (opposite direction to the arrow in FIG. 18).

Therefore, as illustrated in FIGS. 14 to 18, the housing 11 is provided with the pair of deformation preventing portions 103 that abuts on the pair of arm connection parts 15 in a detaching direction when the housing 11 is detached from the bracket 5.

The pair of deformation preventing portions 103 is provided to extend inward in a width direction on both sides of an opening facing the bracket 5 in the protective portion 61 of the housing 11.

Figure 15:
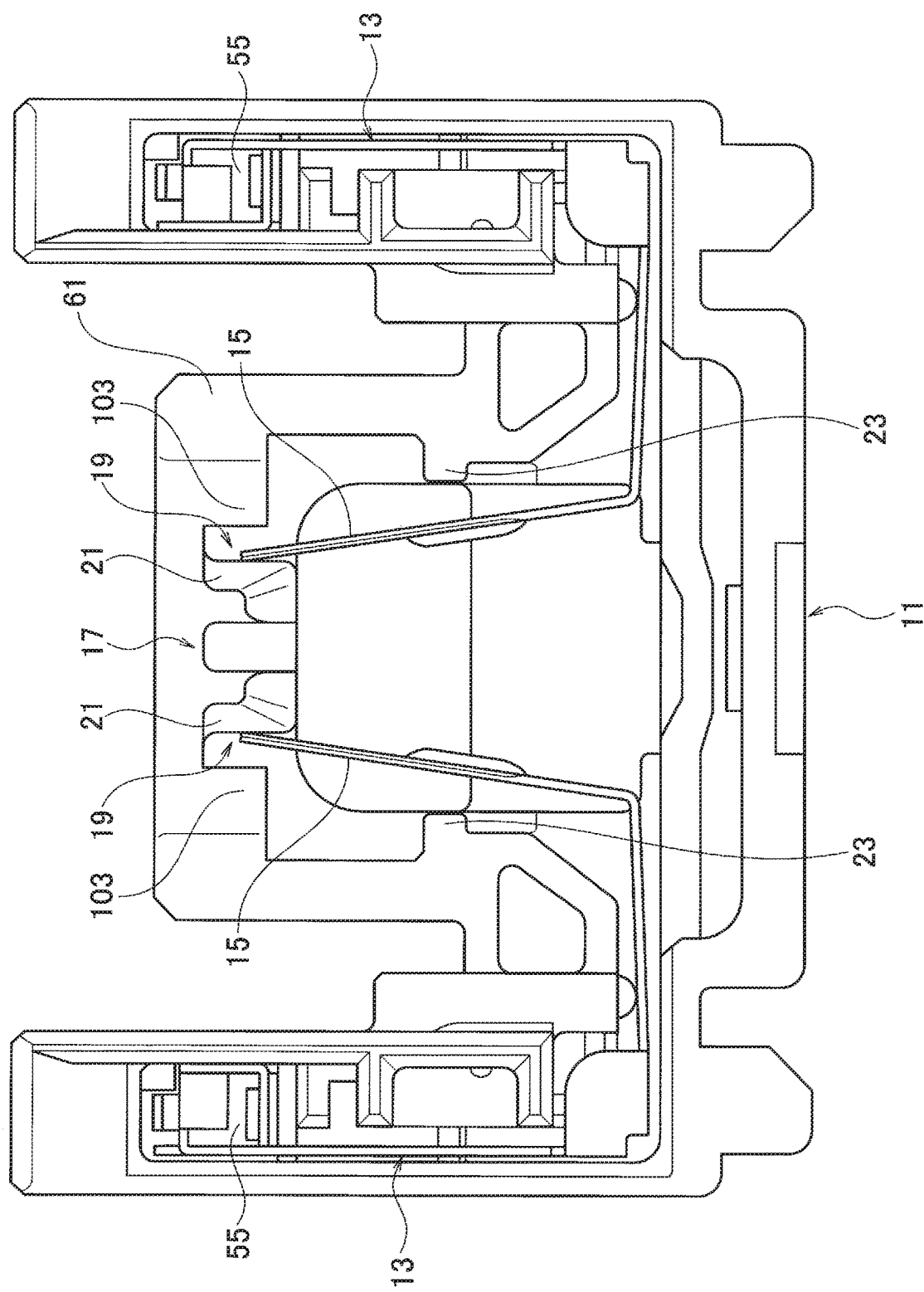
FIG. 15 is a plan view when a pair of connector terminals is accommodated in the housing of the sun visor connector according to the second embodiment.

Here, in a state where the pair of connector terminals 13 is accommodated in the housing 11, the pair of arm connection parts 15 abuts on the preliminary displacement portion 17 and is preliminarily displaced in a direction of being separated from each other as illustrated in FIG. 15.

At this time, a free end side of the pair of arm connection parts 15 is not arranged on the pair of deformation preventing portions 103.

Figure 16:
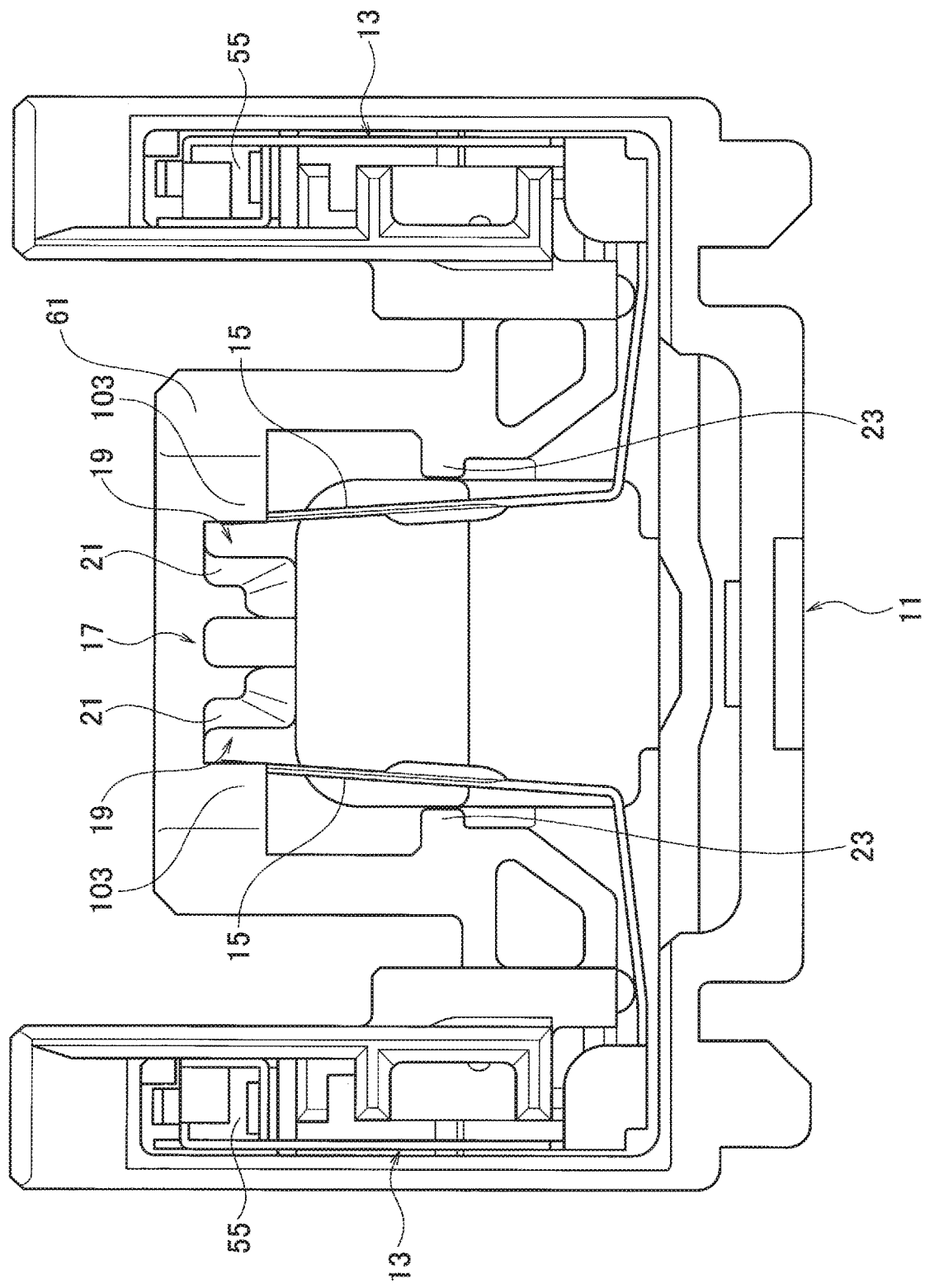
FIG. 16 is a plan view of the housing when the housing is assembled to the bracket of the sun visor connector according to the second embodiment.
Figure 17:
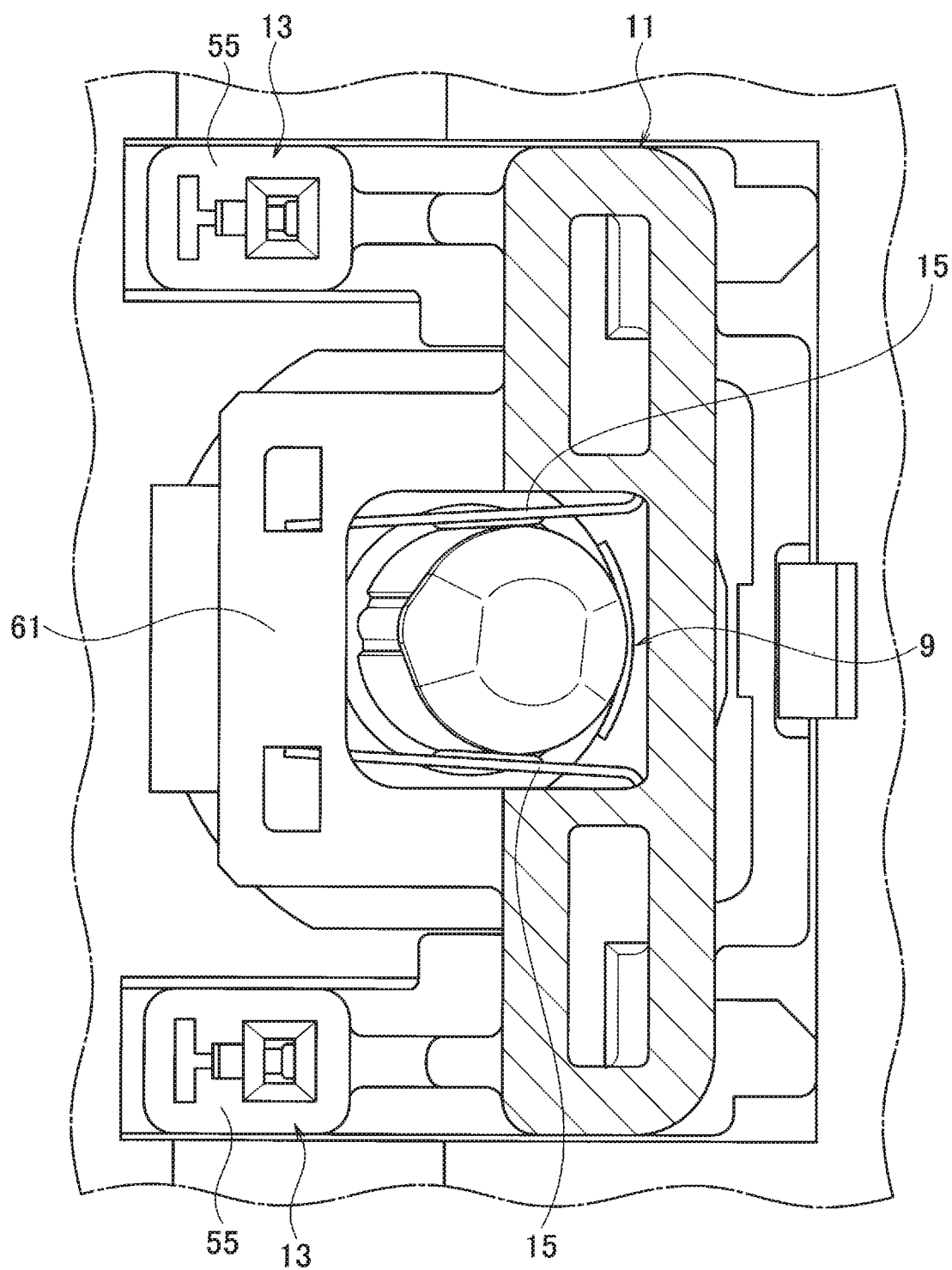
FIG. 17 is a cross-sectional view taken along line A-A of FIG. 14.

The pair of arm connection parts 15 abutting on the preliminary displacement portion 17 comes in contact with the pair of contact portions 37 of the arm portion 9 as the housing 11 is assembled to the bracket 5, and is displaced in a direction of being separated from each other as illustrated in FIG. 16.

At this time, a free end side of the pair of arm connection parts 15 displaced in a direction of being separated from each other is arranged on the pair of deformation preventing portions 103.

An extension length of the pair of deformation preventing portions 103 is set so that the pair of deformation preventing portions 103 abuts on a surface of the pair of arm connection parts 15 facing the bracket 5, until the pair of arm connection parts 15 is displaced in a direction of being separated from each other (here, the arm connection part 15 abuts on the excessive displacement preventing portion 23) from a state where the pair of arm connection parts 15 is in contact with the pair of contact portions 37 and 37 of the arm portion 9.

By providing the pair of deformation preventing portions 103 in this manner, even if the pair of arm connection parts 15 and the end of the arm portion 9 slide when the housing 11 is detached from the bracket 5, the pair of deformation preventing portions 103 is constantly in contact with a surface of the pair of arm connection parts 15 facing the bracket 5 in the detaching direction.

For this reason, even if the pair of arm connection parts 15 is about to deform in the opposite direction to the detaching direction of the housing 11 from the bracket 5 due to sliding friction between the pair of arm connection parts 15 and the end of the arm portion 9, the pair of arm connection parts 15 is not deformed by abutting on the pair of deformation preventing portions 103.

Therefore, even if the housing 11 is detached from the bracket 5, the pair of arm connection parts 15 is not deformed in the opposite direction to the detaching direction, and connection reliability can be maintained.

In the sun visor connector 101 according to the second embodiment, the housing 11 is provided with the pair of deformation preventing portions 103 that abuts on the pair of arm connection parts 15 in the detaching direction when the housing 11 is detached from the bracket 5. Accordingly, when the housing 11 is detached from the bracket 5, the pair of arm connection parts 15 can be prevented from being deformed in the opposite direction to the detaching direction by sliding between the pair of arm connection parts 15 and the end of the arm portion 9.

The pair of deformation preventing portions 103 is arranged in a manner being able to abut on a free end side of the pair of arm connection parts 15 until the pair of arm connection parts 15 is displaced in the separating direction from a state in which the pair of arm connection parts 15 and the end of the arm portion 9 are connected. Accordingly, the size of the pair of deformation preventing portions 103 can be minimized, and the housing 11 can be suppressed from becoming large in size.

Third Embodiment

A third embodiment will be described with reference to FIGS. 19 to 24.

In a sun visor connector 201 according to the third embodiment, a pair of deformation preventing portions 203 is arranged in a manner being able to abut on a free end side of the pair of arm connection parts 15 until the pair of arm connection parts 15 is displaced in the separating direction beyond a state in which the pair of arm connection parts 15 and the end of the arm portion 9 are connected from a state in which the pair of arm connection parts 15 abuts on the preliminary displacement portion 17.

Note that, in the third embodiment, configurations which are similar to those of the first embodiment are denoted by the same reference numerals, and description of the configurations and functions refers to the first embodiment and will be omitted. Functions and effects obtained from such similar configurations are similar.

As illustrated in FIGS. 19 to 24, the pair of deformation preventing portions 203 is arranged on an opening side facing the bracket 5 in the protective portion 61 of the housing 11, and is provided to extend outward in a width direction from the preliminary displacement portion 17.

A tip side of the pair of deformation preventing portions 203 (the opposite side to the preliminary displacement portion 17) is opened so as to allow a free end side of the pair of arm connection parts 15 to pass through when the pair of excessive displacement preventing portions 23 abuts on the pair of arm connection parts 15.

Figure 20:
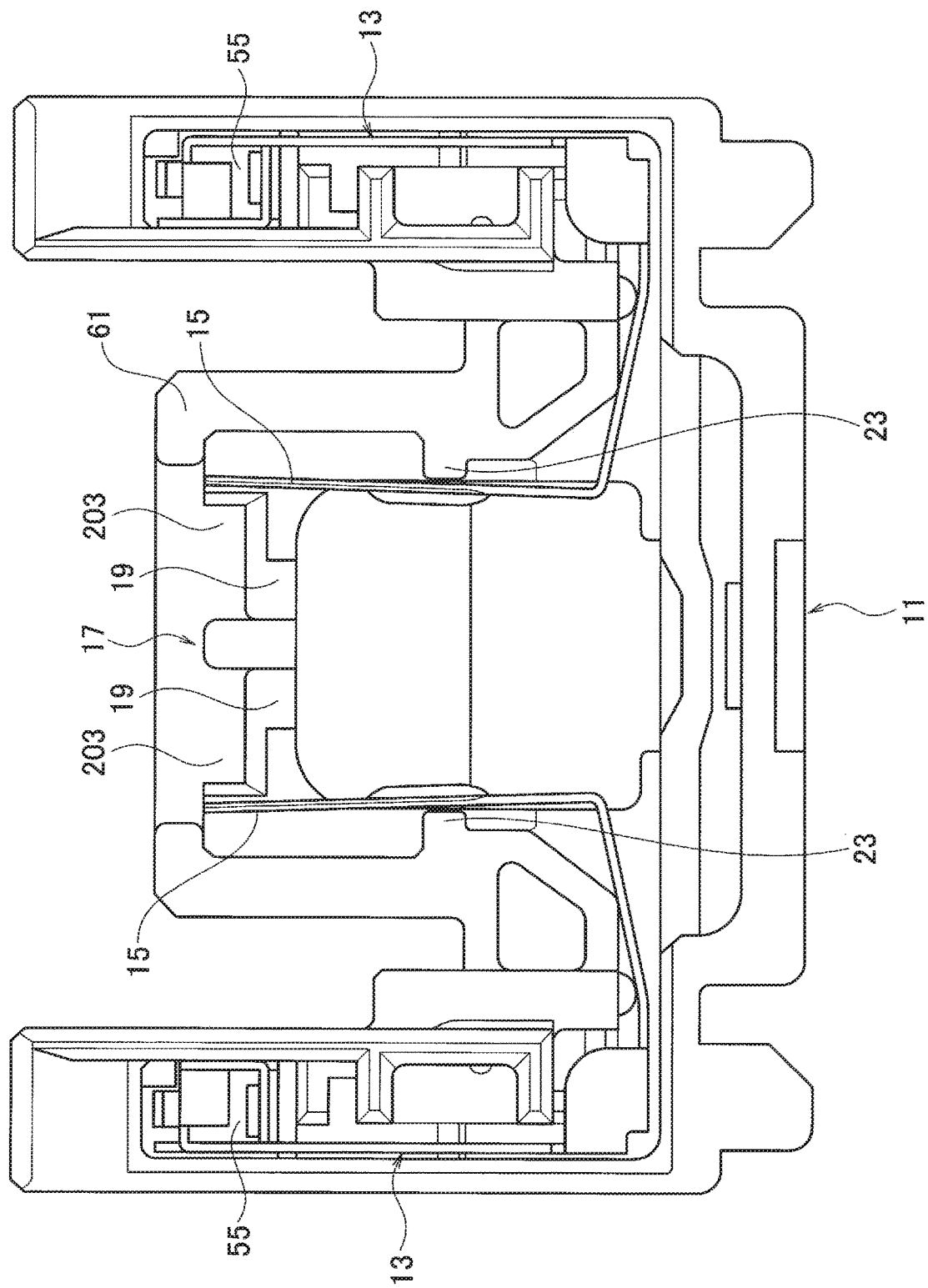
FIG. 20 is a plan view when a pair of connector terminals is accommodated in the housing of the sun visor connector according to the third embodiment.

A free end side of the pair of arm connection parts 15 is arranged on the pair of deformation preventing portions 203 in such a manner that the pair of arm connection parts 15 is temporarily displaced in a direction of being separated from each other as illustrated in FIG. 20 by an operator, an assembling machine, or the like when the pair of connector terminals 13 is assembled to the housing 11, a tip side of the pair of deformation preventing portions 203 is allowed to pass through, and the pair of arm connection parts 15 is restored.

Figure 21:
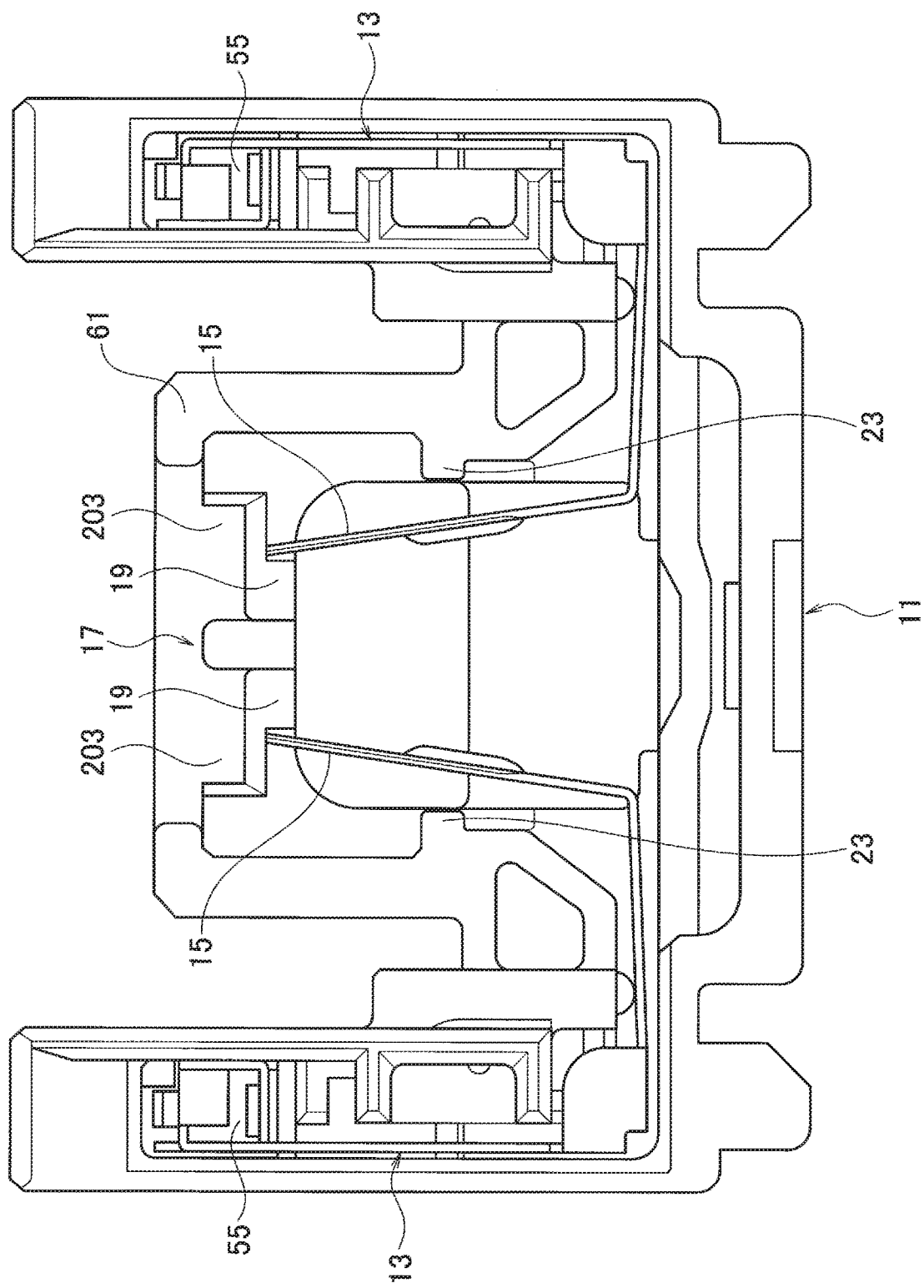
FIG. 21 is a plan view when the pair of connector terminals is accommodated in the housing of the sun visor connector according to the third embodiment.
Figure 22:
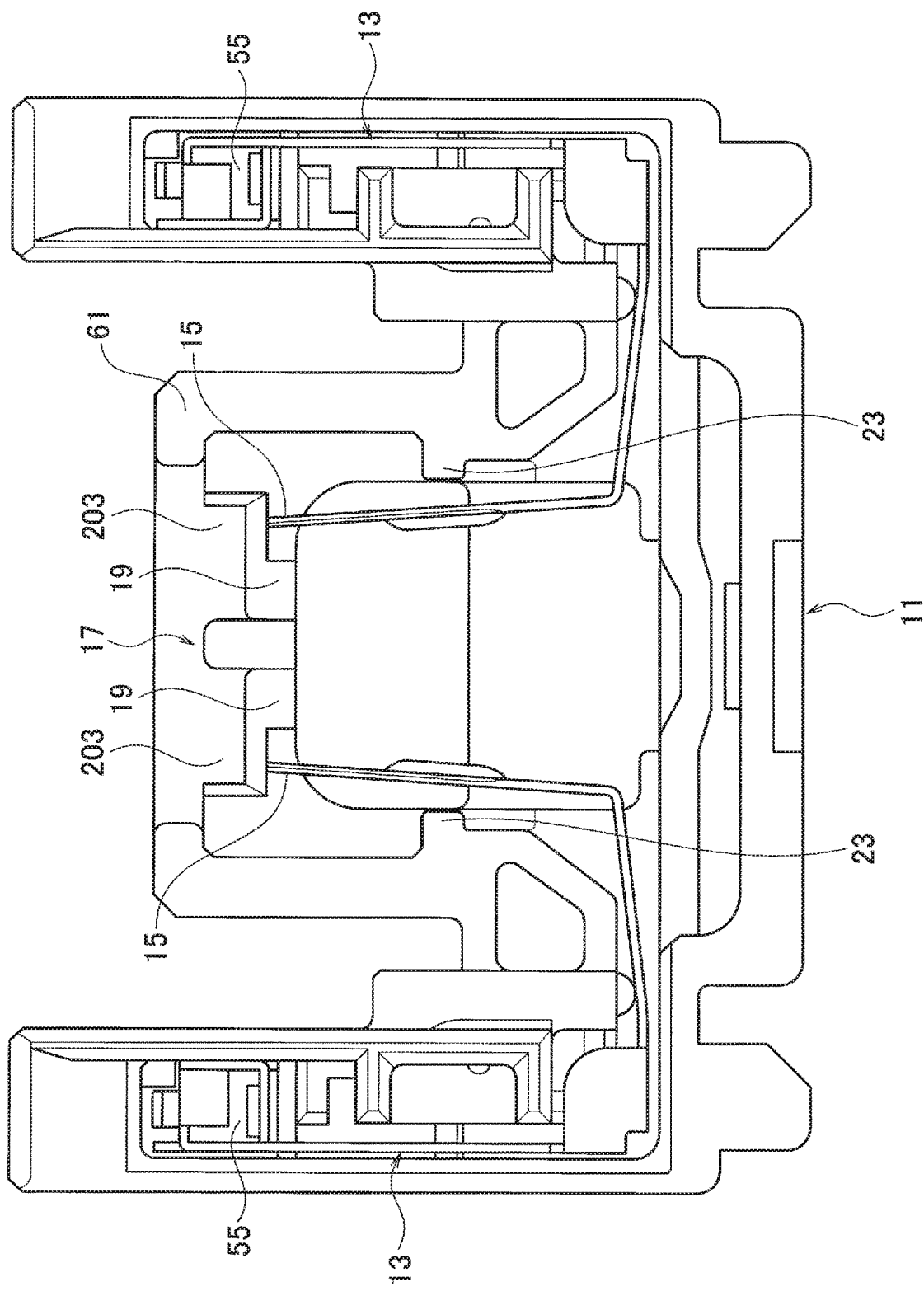
FIG. 22 is a plan view of the housing when the housing is assembled to the bracket of the sun visor connector according to the third embodiment.
Figure 23:
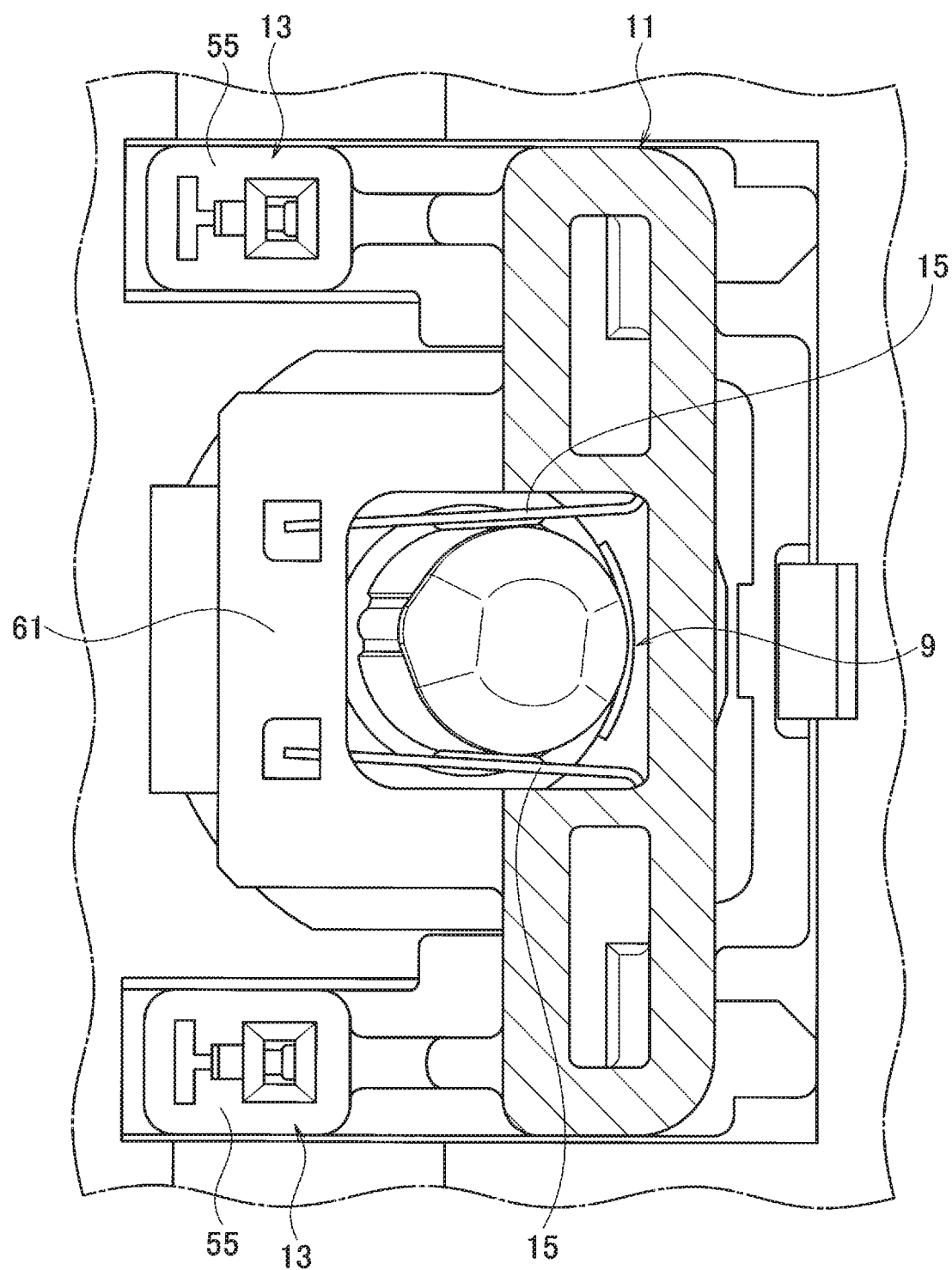
FIG. 23 is a cross-sectional view taken along line C-C in FIG. 19.
Figure 24:
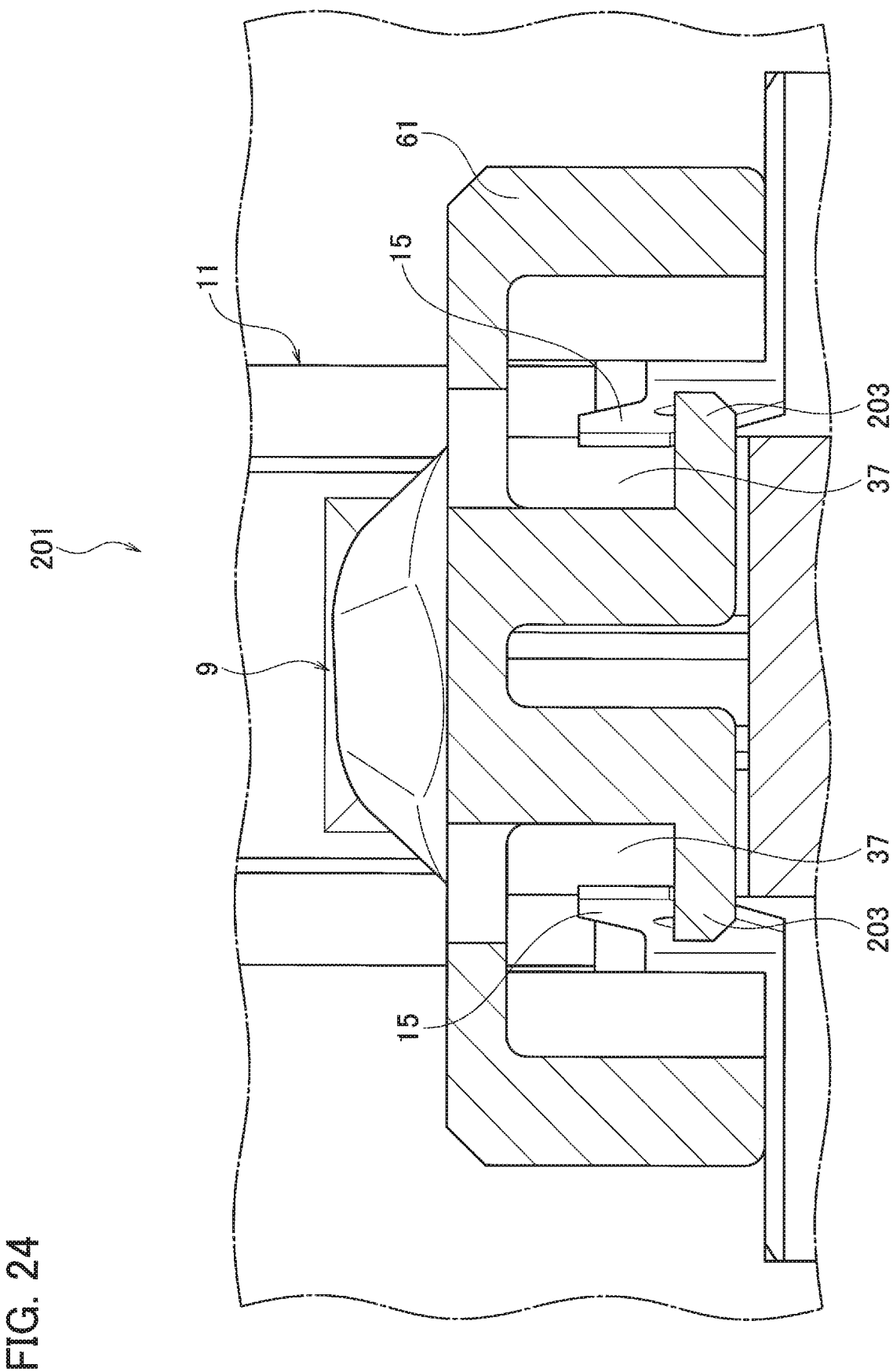
FIG. 24 is a cross-sectional view taken along line D-D in FIG. 19.

In a state where the pair of connector terminals 13 is accommodated in the housing 11, the pair of arm connection parts 15 arranged in the pair of deformation preventing portions 203 abuts on the preliminary displacement portion 17 and is preliminarily displaced in a direction of being separated from each other as illustrated in FIG. 21.

An extension length of the pair of deformation preventing portions 203 is set so that the pair of deformation preventing portions 203 abuts on a surface of the pair of arm connection parts 15 facing the bracket 5, until the pair of arm connection parts 15 is displaced in a direction of being separated from each other (here, the arm connection part 15 abuts on the excessive displacement preventing portion 23) from a state where the pair of arm connection parts 15 abuts on the preliminary displacement portion 17.

For this reason, the pair of deformation preventing portions 203 is arranged so as to be able to abut on the pair of arm connection parts 15 which is displaced in the direction of being separated from each other in either attachment or detachment of the housing 11 to or from the bracket 5.

Specifically, the pair of deformation preventing portions 203 abuts on surfaces of the pair of arm connection parts 15, which is displaced in a direction of being separated from each other, facing the bracket 5 by being in contact with the pair of contact portions 37 of the arm portion 9 when the housing 11 is assembled to the bracket 5.

On the other hand, the pair of deformation preventing portions 203 abuts on surfaces of the pair of arm connection parts 15, which is displaced slightly in a direction of being separated from each other, facing the bracket 5 by sliding between the pair of arm connection parts 15 and the end of the arm portion 9 when the housing 11 is detached from the bracket 5.

By providing the pair of deformation preventing portions 203, not only the arm connection part 15 can be prevented from being deformed in the opposite direction to the separating direction due to sliding between the pair of arm connection parts 15 and the end of the arm portion 9 when the housing 11 is detached from the bracket 5, but also the arm connection part 15 can be constantly prevented from being deformed in the opposite direction to the detaching direction in a state where the connector terminal 13 is accommodated in the housing 11.

In the sun visor connector 201 according to the third embodiment, the pair of deformation preventing portions 203 is arranged in a manner being able to abut on a free end side of the pair of arm connection parts 15 until the pair of arm connection parts 15 is displaced in the separating direction beyond a state in which the pair of arm connection parts 15 and the end of the arm portion 9 are connected from a state in which the pair of arm connection parts 15 abuts on the preliminary displacement portion 17. Accordingly, deformation of the arm connection part 15 in the opposite direction to the detaching direction can be constantly prevented.

Note that, in the sun visor connector according to each embodiment, the housing is assembled to the bracket by being rotated, but the housing may be assembled to the bracket linearly.

What is claimed is:

1. A sun visor connector, comprising:
a bracket attached to an attachment member;
an arm portion arranged on a side of one surface of the attachment member of the bracket, configured to rotatably support a sun visor main body, and having an end inserted through the bracket to be rotatably arranged;
a housing fixed to a side of other surface of the attachment member of the bracket and arranged in a vicinity of the end of the arm portion inserted through the bracket;
a pair of connector terminals accommodated in the housing and connected to counterpart terminals arranged on the other surface of the attachment member;
a pair of arm connection parts provided in an elastically deformable manner on the pair of connector terminals and connected by sandwiching the end of the arm portion by a biasing force; and
a preliminary displacement portion provided in the housing, abutting on the pair of arm connection parts, and causing the pair of arm connection parts to be arranged in a separated manner by keeping a biasing force against the end of the arm portion.

2. The sun visor connector of claim 1, wherein
the preliminary displacement portion includes a pair of ribs extending in an accommodating direction when the pair of connector terminals is accommodated in the housing, and
a taper is provided on a front side of the accommodating direction of each of the pair of ribs and inclined in a direction in which the pair of arm connection parts is separated.

3. The sun visor connector of claim 1, wherein
the housing is provided with a pair of excessive displacement preventing portions that abuts on the pair of arm connection parts before the pair of arm connection parts is excessively displaced in a direction of being separated.

4. The sun visor connector of claim 1, wherein
the housing is provided with a deformation preventing portion that abuts on the pair of arm connection parts in a detaching direction when the housing is detached from the bracket.

* * * * *